(12) United States Patent
Block et al.

(10) Patent No.: US 7,712,657 B1
(45) Date of Patent: May 11, 2010

(54) AUTOMATED BANKING MACHINE THAT ENABLES MULTIPLE USERS TO CONDUCT CONCURRENT TRANSACTIONS AT DIFFERENT AREAS OF A DISPLAY SURFACE

(75) Inventors: James Block, North Lawrence, OH (US); H. Thomas Graef, Bolivar, OH (US); Paul D. Magee, Canton, OH (US); Donald S. Nelson, Jr., Akron, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 0 days.

(21) Appl. No.: 12/291,839

(22) Filed: Nov. 13, 2008

Related U.S. Application Data

(60) Provisional application No. 61/002,854, filed on Nov. 13, 2007, provisional application No. 61/002,875, filed on Nov. 13, 2007, provisional application No. 61/002,860, filed on Nov. 13, 2007, provisional application No. 61/002,834, filed on Nov. 13, 2007, provisional application No. 61/002,841, filed on Nov. 13, 2007, provisional application No. 61/002,863, filed on Nov. 13, 2007, provisional application No. 61/002,861, filed on Nov. 13, 2007, provisional application No. 61/002,907, filed on Nov. 13, 2007, provisional application No. 61/002,833, filed on Nov. 13, 2007.

(51) Int. Cl.
*G06Q 40/00* (2006.01)
*G07D 11/00* (2006.01)
*G07F 19/00* (2006.01)

(52) U.S. Cl. .............................. 235/379; 902/8; 902/14; 902/20

(58) Field of Classification Search ...................... None
See application file for complete search history.

(56) References Cited

U.S. PATENT DOCUMENTS

| | | | | |
|---|---|---|---|---|
| 5,952,639 | A * | 9/1999 | Ohki et al. ................... | 235/379 |
| 6,443,359 | B1 * | 9/2002 | Green et al. ................ | 235/379 |
| 6,659,340 | B2 * | 12/2003 | Siemens ...................... | 235/379 |
| 7,070,093 | B2 * | 7/2006 | Siemens et al. ............. | 235/379 |
| 7,450,086 | B2 * | 11/2008 | Thielman et al. ............. | 345/32 |
| 7,599,520 | B2 * | 10/2009 | Dempski et al. ............ | 382/103 |
| 2003/0167203 | A1 * | 9/2003 | Thorne et al. ................. | 705/14 |
| 2006/0016884 | A1 * | 1/2006 | Block et al. ................. | 235/381 |
| 2007/0169132 | A1 * | 7/2007 | Blust et al. .................. | 720/600 |
| 2007/0273670 | A1 * | 11/2007 | Nordahl ....................... | 345/173 |

\* cited by examiner

*Primary Examiner*—Daniel A Hess
*Assistant Examiner*—Suezu Ellis
(74) *Attorney, Agent, or Firm*—Ralph E. Jocke; Daniel D. Wasil; Walker & Jocke

(57) ABSTRACT

An automatic banking machine includes at least one computer, a card reader, transaction function devices, and a display. The display includes a touch display surface having multiple spaced user locations at which transaction sessions by different user can be concurrently conducted. Multiple users can at the same time receive visible outputs from the display surface and provide inputs through physical contact with the display surface. An eye sensing device enables the display surface, based on sensing where a user is looking at the display surface, to display data at the user location.

22 Claims, 14 Drawing Sheets

TRANSACTION FLOW #2

SCENARIO: BANK CUSTOMER WANTS TO TRANSFER FUNDS TO ANOTHER BANK AND APPLY FOR A LOAN

1. Transaction is initiated by reading a user's contactless card.

❶ Attract Screen
   Do you have an account with us?
   -YES
   -NO

2. Screen will recognize user and display user's most common transactions along with all other terminal capable transactions. User will drag interbank transfer and apply for home equity loan buttons into a designated "work" area on the screen.
   HELLO ANNIE, HOW CAN I HELP YOU?
   Work Area — -INTERBANK TRANSFER   -WITHDRAW
   -HOME EQUITY LOAN   -BILL PAYMENT ❷ Hello Annie, How can I help you?

3. Screen will then prompt the user to select an account and drag it into the bank branch they would like to transfer funds to. User selects checking account and drags it into a selected bank logo. Also, since the user selected Home Equity Loan, a bank representative has their photo via a wireless device and is already processing their form while the user completes the funds transaction.   PLEASE SELECT AN ACCOUNT
   -SAVINGS      ➤ -BANK
   -CHECKING ——     -BANK ❸ Please select an account and drag to appropriate branch. HOME LOAN PROCESSING..

4. Screen prompts user to enter an amount to transfer. There will be a digital representation of a keypad, on the screen, for the user to touch. User selects enter when finished.          PLEASE ENTER AN AMOUNT TO TRANSFER
                    AMOUNT ENTRY BOX
            -ENTER           -CLEAR ❹ Please enter an amount to transfer.
   HOME LOAN PROCESSING.

5. Screen thanks user and notifies that an e-mail has been sent to their e-mail account notifying them of the transaction.
   THANK YOU. AN E-MAIL HAS BEEN SENT TO YOU TO VERIFY THE TRANSFER.
   This screen will timeout in 10 seconds.

❺ Thank you. An e-mail has been sent to you to verify the transfer. HOME LOAN PROCESSING..

6. Screen will prompt user to meet with a bank representative for their loan application.
        PLEASE WALK TO THE TELLER'S STATION WHERE STACY IS WAITING TO
        ASSIST YOU WITH YOUR LOAN APPLICATION.
   This prompt is followed by an illustration showing the user how to get to the teller's station. This screen will timeout after 30 seconds and go back to the attract screen.
   This will cue an animation fly-through sequence showing the user walking toward the teller station along with a monitor (at the teller's station). The user is tracked while he/she walks through the branch.

❻ Home Loan. Please walk to the Teller's station.........

Fig 12

AUTOMATED BANKING MACHINE THAT ENABLES MULTIPLE USERS TO CONDUCT CONCURRENT TRANSACTIONS AT DIFFERENT AREAS OF A DISPLAY SURFACE

CROSS REFERENCE TO RELATED APPLICATIONS

This application claims benefit pursuant to 35 U.S.C. §119 (e) of U.S. Provisional Application Ser. Nos. 61/002,854; 61/002,875; 61/002,860; 61/002,834; 61/002,841; 61/002,863; 61/002,861; 61/002,907; and 61/002,833, each of which was filed Nov. 13, 2007, and the disclosures of each of which are incorporated herein by reference.

TECHNICAL FIELD

This invention relates to banking systems controlled by data bearing records that may be classified in U.S. Class 235, Subclass 379.

BACKGROUND ART

Automated banking machines may include a card reader that operates to read data from a bearer record such as a user card. Automated banking machines may operate to cause the data read from the card to be compared with other computer stored data related to the bearer or the bearer's financial accounts. The machine operates in response to the comparison determining that the bearer record corresponds to an authorized user, to carry out at least one transaction which may be operative to transfer value to or from at least one account. A record of the transaction is also often printed through operation of the automated banking machine and provided to the user. Automated banking machines may be used to carry out transactions such as dispensing cash, the making of deposits, the transfer of funds between accounts, and account balance inquiries. The types of banking transactions that may be carried out are determined by the capabilities of the particular banking machine and system, as well as the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as a bank to carry out financial transactions. Such transactions may include for example, the counting and storage of currency notes or other financial instrument sheets, the dispensing of notes or other sheets, the imaging of checks or other financial instruments, and other types of transactions. For purposes of this disclosure an automated banking machine or an automated taller machine (ATM) shall be deemed to include any machine that may be used to carry out transactions involving automated transfers of value.

When banks are open for business customers enter the bank. The bank usually has no advance notice when a banking customer is going to enter the bank or how many customers will enter the bank for any given time period. At the time a banking customer enters a bank the bank has no way of knowing which type of transaction the banking customer is going to request, or if the banking customer will be requesting multiple transactions. If all customers currently in a bank approach the teller or any other human or machine resource of the bank at the same time, that banking resource may become overburdened and unable to process all the banking customer requests in a timely matter. Long wait times may occur and the banking customers at the end of a line for a particular banking service may have a negative banking experience.

When a banking customer enters a bank, he may not know where to proceed to conduct a particular banking transaction. The banking customer may need to resort to looking for signs pointing him to the area of the bank to conduct the particular transaction he desires to conduct. Alternatively, the banking customer may need to resort to looking for a map of the banking branch or facility so he may determine from a map where to conduct his transaction.

When a banking customer enters a bank branch, he often will want to conduct multiple transactions. The banking customer may have no way of knowing which bank resources are busy and which are available. The banking customer may just have to guess or just pick the transaction to conduct first by random thought process. If the banking customer guesses in a way that directs him to a resource for which there is a long wait, he will spend more time to complete his transactions.

Often when the banking customer needs to personally speak with a person who has more than just clerical authority, such as a banking officer, that officer may be busy. The banking customer may need to wait in a waiting area. The banking customer may leave the waiting area to talk with a friend, use the restroom, or simply get tired and leave the bank. When the busy banking officer becomes free, the officer may go to the waiting area to greet the banking customer waiting to see them. Because the bank officer often does not know what the waiting banking customer looks like, the bank officer needs to resort to calling the customer's name near the waiting area. The banking officer often may not have any way of knowing if the banking customer has left the waiting area or the bank.

For many banking transactions such as opening a new account, banking customers need to provide the bank information about themselves. Typically, a banking officer may call the banking customer to the banking officer's desk and then begin to ask the banking customer a lot of questions. For example, the bank officer may ask the banking customer for the customer's name, address, phone numbers, place of employment, who in the family may access the account, and then a series of questions about what type of account the customer is interested in opening. Sometimes as the banking customer provides the information to a banking officer, mistakes are made when the banking officer enters the banking customer information into the banking computer systems. The officer may hit the wrong keyboard key, and because the banking customer may not be looking at the computer screen the officer is looking at, the error goes undetected. Other banking customers may speak with an accent that is hard for the banking officer to understand, so errors may be entered into the banking computer system because of a misunderstanding between the banking customer and banking officer.

Bank tellers and officers often need to follow a precise sequence of events to properly process a banking customer banking request. There may be a certain sequence of steps to authenticating checks and a different sequence to issue a certificate of deposit. Because banking employees need to follow many different sequences of steps for many different types of banking transactions, sometimes steps are omitted or performed incorrectly. Often several different forms are filled out for each of a variety of banking transactions. Because banking employees need to know which of several forms correspond with each transaction, mistakes are made by forgetting to fill out a form, filling out the wrong form or making a mistake while filling out a form.

Banking machines and systems may benefit from improvements.

OBJECTS OF EXEMPLARY EMBODIMENTS

It is an object of an exemplary embodiment to provide an automated banking apparatus that operates responsive to data read from data bearing records.

It is an object of an exemplary embodiment to provide an apparatus that utilizes data read from data bearing records to facilitate the carrying out of financial transactions.

It is an object of an exemplary embodiment to provide apparatus that improves customer banking transactions.

It is a further object of an exemplary embodiment to provide apparatus that improves the banking customer banking experience.

It is a further object of an exemplary embodiment to provide apparatus and methods to more efficiently use bank personnel and resources.

It is an object of an exemplary embodiment to provide apparatus and methods to efficiently collect banking customer information.

It is an object of an exemplary embodiment to provide apparatus and methods to guide a banking customer to the location of a particular banking transaction resource.

It is an object of an exemplary embodiment to provide apparatus and methods to reduce the errors entered into a banking computer system while collecting customer information.

It is an object of an exemplary embodiment to provide apparatus and methods to reduce the overall time a banking customer spends in a bank conducting banking transactions.

It is an object of an exemplary embodiment to provide apparatus and methods for a banking employee to recognize and personally greet a banking customer.

It is an object of an exemplary embodiment to provide apparatus and methods to track a banking customer within a bank location.

It is an object of an exemplary embodiment to provide apparatus and methods to improve how a banking customer accesses data with a computer.

It is an object of an exemplary embodiment to provide apparatus and methods to allow more than one person to access and modify the same banking data through the same device at the same time.

It is an object of an exemplary embodiment to provide apparatus and methods to begin a banking transaction before a banking customer arrives at a bank transaction location.

It is an object of an exemplary embodiment to provide apparatus and methods to recognize high value banking customers and tailor a response to process their banking transactions.

It is an object of an exemplary embodiment to provide apparatus and methods for verifying if a certain customer is at a certain place at a banking location.

It is an object of an exemplary embodiment to provide apparatus and methods to reserve banking resources for a banking customer and to indicate those resources are reserved.

It is an object of an exemplary embodiment to provide apparatus and methods to secure different banking areas according to different groups of people or resources.

It is an object of an exemplary embodiment to provide apparatus and methods to route a banking customer to a bank or within a bank.

It is an object of an exemplary embodiment to provide apparatus and methods to route a banking customer from one banking transaction to the next banking transaction.

Further objects of exemplary embodiments will be made apparent in the following Description of Exemplary Embodiments.

The foregoing objects are accomplished in exemplary embodiments by a system which includes one or more welcome terminals near the customer entrance of a bank facility. In the exemplary embodiment the welcome terminal may be operatively connected to one or more branch bank computers. A welcome terminal may alternatively be referred to herein as a greeting terminal. For purposes of this disclosure, reference to a single computer shall include multiple computers and vice versa. The bank branch computer may be operative to monitor banking resources of the branch bank. For purposes of this disclosure, a "resource" of the bank facility refers to people or things that a banking customer uses or interacts with in order to carry out a transaction or a portion of a transaction. Thus resources may include, for example, an automated teller machine (ATM), an electronic kiosk, or other electronic terminal which may receive inputs from or provide outputs to the customer. Resources also include bank tellers who perform transactions for users, as well as teller stations at which a user may communicate with a teller or perform other actions. Resources may also include banking officers of the type previously discussed, who perform tasks other than the clerical or routine banking tasks that are performed by tellers for customers who stand in a line or otherwise have the service perform at a teller station. As previously discussed, banking officers may generally participate in more involved types of transactions or business activities with the customer than are conveniently conducted in a teller line. Of course, these types of banking resources are exemplary of resources that may be utilized within a banking facility.

In an exemplary arrangement, a banking customer enters the branch bank. The welcome terminal may be operative to provide outputs that prompt the banking customer to provide inputs to the terminal that indicate what banking transactions the banking customer would like to perform. In the exemplary embodiment the terminal operates to cause the availability of the banking resources corresponding to the requested customer transaction or transactions to be determined. This may be done through operation of the terminal and the at least one branch bank computer. In response to the determination, the terminal may direct the banking customer to the location of a resource needed to conduct a banking transaction that the computer has determined to be the most likely to be available to conduct the customer's desired transaction at the earliest time.

In some exemplary embodiments when the banking customer indicates to the welcome terminal the desire to perform a task that will involve the provision of customer data, the user terminal may operate responsive to the at least one branch bank computer to begin prompting the user to input to the terminal at least some of the data needed. The terminal operates in response to its programming to prompt the user to provide inputs to input devices on the terminal that correspond to at least some of the data needed for purposes of conducting the transaction. After such data has been input, the terminal thereafter operates to provide outputs to the user to direct the user to the resource in the banking facility that can complete the transaction desired by the user. When the banking customer eventually reaches the resource to execute the banking transaction needing the data entered at the welcome terminal, the bank computer system may operate to have already transferred that data from the welcome terminal to the resource at the transaction location.

In some exemplary embodiments while the banking customer may be operating the welcome terminal, a picture or image may be captured of the banking customer. This may be done using equipment that described in U.S. Pat. No. 6,583,813, the disclosure of which is incorporated herein by reference. The apparatus used to capture the image may thereafter cause the image to be output on a terminal or similar device to a bank employee who is responsible for carrying out a transaction requested by the customer. A banking employee may use the image to later find the banking customer. When the banking employee recognizes the banking customer from the image, the banking employee may personally greet the banking customer by name. In some exemplary embodiments the banking customer will be prompted through outputs from the welcome terminal on how to proceed from the welcome terminal to a waiting area or to a first transaction area associated with a banking resource. In some exemplary embodiments a computer in operative connection with the welcome terminal may compare the transactions the banking customer has indicated the customer wants to perform with the availability of the resources to perform those transactions. The transaction that could be performed the earliest may be determined through operation of the computer. The banking customer may then be prompted by outputs through an output device or by a banking resource how to proceed from the first transaction area to the next transaction area.

In some exemplary embodiments the banking customer may be tracked while moving about the banking facility. This may be done to allow the banking customer to be more readily found by a banking employee. In some exemplary embodiments the banking customer may be tracked with cameras and image recognition software. This may be done using a system like that described in the incorporated disclosures. This could be done through software that recognizes facial images. In other exemplary embodiments the banking customer may be tracked with cameras near floor level using software that can recognize a customer's shoe or shoes among different shoe patterns. In still other embodiments the banking customer may be tracked by an imaging system that operates to recognize features unique to the customer such as clothing or movement or style of walking that may be unique to that customer. In yet some other exemplary embodiments the banking customer may be tracked by sensors in the floor that detect the weight shifting caused by the user's walking pattern over an array of weight or other sensors as the banking customer walks across the banking surface. In yet some other exemplary embodiments, the banking customer may be tracked by movement of the customer's shoe images with low level cameras. In some exemplary embodiments the banking customer may be tracked by the way the banking customer walks or by a distinctive stride of the banking customer. In other exemplary embodiments, the banking customer may be tracked through the operation of multiple types of sensors of the type previously described. As can be appreciated, imaging systems, a plurality of sensors such as those operative to sense weight, location or other features, may be in operative connection with one or more computers. The computers operate responsive to the sensed information to determine the movement of and the then current position of the particular banking customer. Of course these approaches are exemplary.

In some exemplary embodiments after the banking customer indicates a desired transaction through one or more inputs at the welcome device, and the banking computer system determines the first transaction, a reservation indication may be placed at the first transaction resource or location.

In some exemplary embodiments a reservation indication may be given to an output device at the designated transaction resource or location, which output device is in operative connection with the at least one computer. The output device may operate to display the name or other identifying data associated with the banking customer, to advise the customer of the location of the resources where the customer is to conduct the transaction.

An exemplary embodiment may include a method of processing banking customer transactions that includes the steps of: (a) prompting a banking customer through outputs at a welcome terminal located near the bank entrance, to provide inputs to the terminal corresponding to the types of transactions the banking customer may want to perform; (b) capturing an image of the banking customer responsive to operation of the at least one computer while the banking customer may be at the welcome terminal; (c) determining with at least one computer responsive to the input received in step (a), which banking transaction will be processed first and where to route the banking customer; (d) directing through operation of the terminal, the banking customer to a first location; (e) outputting the image of the banking customer captured in (b) through an output device to a bank employee; (f) tracking the banking customer in at least one location through operation of at least one computer; and (g) operating the at least one computer to cause the at least one location of the banking customer on a handheld device operated by the bank employee whereby the banking employee can find the banking customer.

In another exemplary embodiment a method of processing banking customer transactions includes the steps of: (a) prompting a banking customer at a welcome terminal located near the bank entrance to input the types of transactions the banking customer may want to perform; (b) receiving the input from the banking customer corresponding to the desired transactions; (c) capturing an image of the banking customer while the banking customer may be at the welcome terminal; (d) processing the input received in step (a) to determine which banking transaction will be processed first and where to route the banking customer; (e) routing the banking customer to a first location; (f) transmitting the data entered by the banking customer to the banking resources that will handle the first banking transaction, wherein the first banking transaction may begin before the banking customer arrives at the first transaction location; (g) transmitting the image of the banking customer to a bank employee; (h) processing the first transaction; (i) determining which banking transaction may be processed second; (j) transmitting the data entered by the banking customer to the banking resource that will handle the banking transaction that was determined to be processed second, wherein the banking transaction to be processed second may begin before the banking customer arrives at the second transaction location; and (j) routing the banking customer to a second location corresponding to where the banking resource for the second transaction is located. In some exemplary embodiments when the banking customer is routed to the second location, the banking customer may be presented a map or floor plan of the bank and an indication of how to proceed from the first location to the second location. In the exemplary embodiment a position at the second location may be reserved for the banking customer and may be marked with a display output or other output indicating that the position is reserved for the banking customer and may include the name of the banking customer.

In some exemplary embodiments a banking computer system including at least one computer may be used to process banking customer transactions. A computer may be in operative connection with at least one banking database which is alternatively referred to herein as a data store. The database may include data corresponding to banking customer data and banking transactions. A computer may be operatively connected to at least one transaction terminal or automated banking machine. In some exemplary embodiments a computer may be operative to communicate with a mobile banking customer device such as a cell phone operated by a user remotely located from the bank. A computer may be operative to receive requests for banking transactions from a customer through operation of the mobile device. A computer may be operative to determine the closest bank that has the resources to process all the selected transactions. A computer may be operative to determine a first location for processing the first transaction. In some exemplary embodiments a computer may be operative to reply and cause the banking customer mobile device to prompt the banking customer to input into the banking customer mobile device the information needed for the requested banking transactions. A computer may be in operative connection with the at least one transaction terminal at the first location to cause a copy of information input through the banking customer mobile device to be transferred to the at least one transaction terminal or automated banking machine at the first location. The processing of the first transaction may begin at the first location before the banking customer arrives at the first location.

In some exemplary embodiments the first location may be the location of the nearest branch bank to the banking customer that has the resources to handle each of the requested transactions. In some embodiments the nearest branch bank may include a mobile branch bank which may be selectively located by the bank at different locations during different days or other time periods. In some exemplary embodiments a computer may be operative to cause the mobile device of the banking customer to display a map of how to proceed to the first location. In some exemplary embodiments a computer may be operative to retrieve data corresponding to a saved image and/or biometric data for the banking customer from a banking database, and transfer the image and/or data to the resource at the first location at the bank where the first transaction will be performed. In some exemplary embodiments a computer may be operative to assist in processing the first transaction at the first location.

In some exemplary embodiments a computer may be operable to determine one or more subsequent transactions which correspond to uncompleted transactions the banking customer requested through a mobile device or other input device. A computer may be operative to determine a second resource and associated location for processing the second transaction. A computer may be operative to communicate with and cause the mobile banking customer device to prompt the banking customer as to how to proceed to the second location. In some exemplary embodiments a reservation for the banking customer at the second location may be created in a data store through operation of the computer before the first banking transaction may be completed by the first resource at the first location. The processing of the second transaction may be started by the at least one computer before the first transaction may be competed or the banking customer arrives at the second location.

In some exemplary embodiments a computer may be operable to track the banking customer within and/or in proximity to the bank. In some exemplary embodiments the cameras inside the bank may be operatively connected to at least one computer. The at least one computer may be operable to track the banking customer within the bank using data corresponding to images captured from the cameras and image tracking software running on a computer.

In some exemplary embodiments the computer may be operably connected to a transaction terminal such as an automated banking machine at the first location. The transaction terminal may be operable to prompt a banking employee with outputs through a display that includes a summary of what needs to be accomplished to process the transaction. The computer may also be operably connected to the transaction terminal to present a list of steps to the banking employee in a fixed order.

In some exemplary embodiments the name of the banking customer may be displayed through an output device at the first location in response to operation of the computer. In some exemplary embodiments the first location may be resource which comprises a drive-through lane and a computer may be operative to reserve a drive-through lane for the banking customer. In some exemplary embodiments a computer may be operable to display the name or other identifier of the banking customer on a suitable output device or electronic display or sign to reserve the drive-through lane for the banking customer.

In some exemplary embodiments a computer may be operable to recognize when the banking customer approaches the bank. In some exemplary embodiments a computer may be operable to recognize the banking customer when the banking customer approaches the bank using data corresponding to images captured from the cameras and image analysis software such as facial recognition software running on a computer.

In some exemplary embodiments a computer may be operable to generate a one-time password or other identifying sequence of characters and send it to the banking customer mobile device. A computer may be in operable connection with a banking resource, and may be operable to verify that the banking customer may be located at the at least one banking resource when the banking customer enters the sequence through an input device at the at least one banking resource. In some exemplary embodiments the sequence may consist of digits and the banking resource may operate to dispense currency.

An exemplary embodiment may include a method of processing banking customer transactions that includes the steps of: (a) receiving at least one input from a banking customer mobile device, before the banking customer arrives at a bank, corresponding to the types of transactions the banking customer would like to perform; (b) accepting data entered by the banking customer on a mobile device that corresponds to the banking transactions requested; (c) processing the at least one input to determine which banking transaction will be processed first and where to route the banking customer; (d) transmitting the data entered by the banking customer to the banking resource that will handle the banking transaction that was determined by the computer to be the banking transaction to be processed first, wherein the banking transaction to be processed first may begin before the banking customer arrives at the first transaction location; (e) routing the banking customer to a first location as the banking customer arrives at the bank; (f) detecting when the banking customer arrives at the bank transaction location; (g) generating and presenting to the banking customer a one-time message to be used to verify the banking customer may be at the first location; (h) verifying that the banking customer may be at the first location; (i) processing the first transaction.

Some exemplary embodiments that operate to process customer banking transactions may use a banking computer system with at least one computer. A computer may be in operative connection with at least one banking database. The at least one banking database includes data which corresponds to banking customer data and banking transactions. A surface computer may be in operative connection with a banking computer and a banking database. In some exemplary embodiments the display surface computer itself may comprise an interface surface that allows multiple users to interact with the computer by providing inputs and outputs by viewing and through touching the surface. The surface computer may be adapted to allow a banking customer to selectively cause the display of indicia corresponding to banking services on the display surface, and may be operative to allow a banking customer to organize and compare the accessed banking services. In some exemplary embodiments the surface computer may be operative to allow the banking customer to view indicia corresponding to different features of the displayed banking services. In some exemplary embodiments the surface computer includes an interface adapted to allow a banking customer to select one of the banking services to be performed by touching the display surface.

In some exemplary embodiments the surface computer may have its input/output display surface comprised of a table top, or the surface computer may have its user interface on or in a wall. In some embodiments the display surface may include a single panel, while in other embodiments the display surface comprises multiple panels in a generally planar arrangement. In some exemplary embodiments the surface computer is in operative connection with an image capture device or other sensing device that senses inputs that are operative to cause the computer to recognize the banking customer and to automatically access data corresponding to banking services stored in the banking database that the recognized banking customer commonly performs. In some exemplary embodiments the banking customer may be recognized by identifying data corresponding to an image of the banking customer. In some exemplary embodiments the banking customer image may be recognized by a computer running facial or other image recognition software, and the banking customer image may be captured using a camera. The camera may be in connection with the surface computer. In other exemplary embodiments the banking customer may be recognized by one or more sensors that operate to capture data usable to recognize a mobile device or other item placed on the input/output surface computer belongs to or is uniquely associated with the particular banking customer. The mobile device may be a cell phone, laptop computer, or a personal digital assistant, for example.

In some exemplary embodiments the surface computer may include interfaces adapted to allow the banking customer to transfer data from the mobile device to the surface computer. The surface computer may operate or enable the banking customer to transfer data from the surface computer to the mobile data device. Such suitable interfaces for data transfer may include for example, radio frequency (RF) interfaces, infrared (IR) interfaces, photo sensor type interfaces, or other suitable interfaces that are operative to enable data to be passed between the surface computer and the mobile device. The surface computer may provide a visual interface that allows a banking customer to touch an icon corresponding to the data or instructions on the display surface computer and drag the icon to a zone around or adjacent the mobile device while the mobile device may be in contact with or adjacent to the display surface of the surface computer. In some exemplary embodiments the surface computer may be adapted to allow a banking customer to access existing banking account information. The surface computer may be adapted to display account information through the outputs on the display surface of the surface computer.

In some exemplary embodiments a surface computer may be adapted to allow a banking customer to display banking account information stored on the banking database on the display surface. In some exemplary embodiments when the banking customer may be opening a new banking account, the surface computer may be operative to allow a banking customer and a banking employee to view and enter data on a common area of the display surface of the surface computer. In some exemplary embodiments the surface computer may be programmed to accept simultaneous inputs from both a bank employee and a customer through the display surface. In other exemplary embodiments multiple customers may conduct concurrent transactions at disposed areas of the display surface.

An exemplary embodiment may include a method of processing banking customer transactions with a surface computer that includes the steps of: (a) providing an interface allowing a banking customer to access banking services stored in a banking database through a surface computer; (b) displaying the accessed banking services through the surface computer; (c) providing an interface operative to allow a banking customer to organize and compare the accessed banking services through operation of the surface computer and to compare different features of the displayed banking services; (d) providing an interface operative to allow a banking customer to select one of the banking services through the surface computer to be performed; (e) recognizing a particular banking customer; (f) accessing banking services stored in the banking database through a surface computer that the recognized customer commonly performs; (g) providing an interface to allow the banking customer to transfer data from the mobile data device to the surface computer; and (h) providing an interface to allow the banking customer to transfer data from the surface computer to the mobile data device.

In some exemplary embodiments high value customers are identified when they arrive at the bank. When a high value customer may be detected special banking facilities are reserved for them and in some exemplary embodiments the facilities reserved are for the types of transactions commonly reserved by the high value banking customer. In some exemplary embodiments the high value customer may be detected by a data bearing record which comprises a personal identification device given to the particular banking customer by the bank. In some exemplary embodiments the personal identification device may be a radio frequency identification (RFID) output device that outputs identifying radio signals that may be detected when the banking customer approaches or enters the bank.

In some exemplary embodiments a banking computer system may be used to create personal outputs or responses when communicating with a banking customer during a banking transaction. In some exemplary embodiments a banking computer system is in operative connection with at least one banking database. The database may include data corresponding to banking customer data and different types of banking accounts. In some exemplary embodiments at least one banking transaction terminal such as an automated banking machine is inside a bank, and a banking customer would approach the terminal to conduct a banking transaction. The banking transaction terminal contains a projector suitable for projecting an image that would be perceivable by the banking customer. A camera may be used that may be adapted to capture images of the banking customer approaching or at the at least one banking transaction terminal. A software application running on a computer may be operative to use the images captured by a camera to identify the banking customer when the banking customer approaches the banking transaction terminal. In some exemplary embodiments a computer may be capable of retrieving the personal data about the banking customer from a database of personal information in operative connection with the computer system. The computer may retrieve the personal data of the banking customer to generate one or more personalized messages to the banking customer. A computer may be adapted to generate messages to a banking customer by using previous banking customer responses.

In some exemplary embodiments the projected image may be the image of a person. The projected image may be of a person of the opposite sex of the banking customer. Alternatively, the projected image may be of a person of with similar age, appearance, weight, interests and social status to the banking customer. The projected image may be an image projected on a screen.

In some exemplary embodiments the projected image may comprise a three-dimensional hologram.

In some exemplary embodiments the banking customer responses are stored in the banking database for subsequent use.

In some exemplary embodiments one or more computers may be adapted to analyze the images, such as facial expressions, of the banking customer to determine the mood of the banking customer, so the response to the banking customer may be tailored to the mood of the banking customer. The computer may be adapted to analyze images of the banking customer to recognize a secondary characteristic such as: an item of clothing the banking customer is wearing, a new watch the banking customer has on, a new hair style, weight loss, new jewelry and another person accompanying the banking customer to the bank. When a secondary characteristic may be detected, the generated messages to the banking customer may make reference to or be resolved based on the secondary characteristic.

In some exemplary embodiments one or more computers may be adapted to be in operative connection with a computer database which includes data corresponding to current weather data, recent news stories, and sporting event results. The computer may be operative responsive to selected items of this data to generate tailored messages to the banking customer. In some exemplary embodiments the database records corresponding to the personal information of the banking customer may be updated with each response received from the banking customer in response to output messages.

In some exemplary embodiments one or more computers may be operative to analyze images and movements or actions of the banking customer and resolve patterns that indicate when the banking customer may be in a hurry. When the banking customer is in a hurry the responses generated by the at least one computer may be quicker and shorter. In some exemplary embodiments the computer may be adapted to analyze the images of the banking customer and to recognize when the banking customer may be in need of medical care, and wherein the generated response may be tailored to the medical care needs.

In another exemplary embodiment a method for providing a personal response to a banking customer includes the steps of: (a) recognizing a personal identity of a banking customer when the customer arrives at a bank, through operation of at least one computer; (b) presenting an image to the banking customer responsive to operation of the at least one computer; (c) retrieving personal data about the banking customer from a database in operative connection with the at least one computer; (d) giving the banking customer a personal welcome greeting through at least one output device responsive to operation of the at least one computer; (e) responding to a response from the banking customer through operation of the at least one computer, responsive to the banking customer response and the retrieved personal data to determine a tailored personal response to the banking customer; (f) storing data corresponding to the responses of the banking customer in the banking database for subsequent use; (g) analyzing images of the banking customer through operation of the at least one computer to determine the banking customer's mood so a response to the banking customer may be tailored to the mood of the banking customer; (h) analyzing images of the banking customer through operation of the at least one computer to recognize a secondary characteristic and when a secondary characteristic is detected, the response to the banking customer may be tailored to the secondary characteristic; (h) using through operation of the at least one computer current weather data, recent news stories, and sporting event results to tailor a message to the banking customer; (i) updating the personal database of the banking customer through operation of the at least one computer with a response from the banking customer; (j) analyzing images of the banking customer through operation of the at least one computer and determining that the banking customer is in a hurry, and when the banking customer is determined to be in a hurry, generating responses that are at least one of quicker and shorter; and (k) analyzing images of the banking customer through operation of at least one computer and determining when the banking customer is in need of medical care and tailoring the response to the medical care needs.

In some exemplary embodiments bank security may be improved through operation of a banking computer system with at least one computer. The computer may be in operative connection with a reader device, a plurality of banking resources, and at least one banking database. The banking database may include data corresponding to banking customer data and different types of banking accounts. A detection device may be used that is operative to detect a person entering the banking office. In some exemplary embodiments the banking computer system may assign a security level to the person detected entering the bank. A higher security level has access to more or different banking facilities or operations than a lower security level. In some exemplary embodiments the banking computer system may be operative to activate different banking resources corresponding to the level of security assigned to the person.

In some exemplary embodiments the detection device may provide data that causes a computer to operate to identify the person entering the bank office. The detection device and computer may be operative to recognize the person entering a bank responsive to face recognition software operating in at least one computer using images captured by cameras. The banking computer system may also be operative responsive to image or other data to track the person as he roams within the bank.

In some exemplary embodiments the at least one computer in operative connection with a detection device may identify the person by a radio signal emitted by a mobile device associated with the person. In some other exemplary embodiments the person may be recognized through operation of at least one computer responsive to sensing indica on a card assigned to the person by the bank.

In some exemplary embodiments the banking resources operated by banking customers may include for example, one or more of computer terminals, information kiosks, computer databases, account information, safety deposit boxes, drawers, office spaces, storage areas, automatic banking machines, teller areas, safety deposit box areas, and vault areas. In some exemplary embodiments the security levels and access rights correspond to whether the person is designated as a high value customer, standard customer, new customer, management banking employee, supervisory bank employee, teller or other bank employee. In some exemplary embodiments only banking resources adjacent to the person are activated according to the security level of the person. In some exemplary embodiments only a banking resource immediately adjacent a person is activated if the person has the proper security level to operate that resource.

In some exemplary embodiments a detection device may be operative to detect a person entering the banking office. The person entering the bank has been assigned to a designated one of a plurality of groups of people, where each group may be assigned a different security or privileges level. A higher security level has access to more or different banking facilities or functions than a lower security level. In some exemplary embodiments the bank facility may be segmented into a plurality of security zones. A banking computer system may be operative to activate different banking resources within a security zone corresponding to the level of security or privilege of the people within that zone.

In some exemplary embodiments the security zones correspond to one or more of bank employee office spaces, teller areas, safety deposit box areas, automated banking machines, vaults, and/or public areas. In some exemplary embodiments the groups of people and access rights may correspond to high value customers, standard customers, new customers, management banking employees, supervisory bank employees, tellers and other bank employees. The level of security of high value customers and access rights may be greater than the security level for regular customers; the security level for regular customers and access rights may be higher than the security level for new customers; the security level and access rights for managers may be higher than the security level for supervisory bank employees; the security level and access rights for supervisory bank employees may be higher than the security level for tellers; and the level of security and access rights for tellers may be higher than the security level for other bank employees.

In some exemplary embodiments the banking resources and capabilities accessed may be one or more of computer terminals, kiosks, customer stations, computer databases, account information, safety deposit boxes, drawers, office spaces, storage areas, automatic banking machines, teller areas, safety deposit box areas, and vault areas. The computer databases include a plurality of sub-databases, where each sub-database is assigned to a security level.

In some exemplary embodiments the bank employee with a higher security level or greater access rights may override a lower security level person with regard to using a banking resource that the employee needs to access if a person with a lower corresponding security level may be in the same security zone.

In another exemplary embodiment a method of providing improved security in a bank includes the steps of (a) identifying through operation of at least one computer a person entering the banking office; (b) assigning a security level to the person detected through operation of the at least one computer; (c) activating different banking resources, through operation of the at least one computer, corresponding to the level of security assigned to the person detected; and (d) recognizing the person detected in step (b) through operation of the at least one computer.

In another exemplary embodiment a method of providing security in a bank includes the steps of (a) operating a computer to divide the bank facility into a plurality of security zones; (b) assigning people who access the bank facility into a plurality of security zones through operation of the computer; and (c) activating different banking resources within a security zone responsive to operation of the computer, to the levels of security of the people within that zone.

Of course it should be understood that the features and methods described are exemplary and in other embodiments other approaches may be used.

BRIEF DESCRIPTION OF DRAWINGS

FIG. 12 is a schematic logic flow diagram of an exemplary interface sequence for a request by a banking customer to transfer funds to another bank and apply for a loan.

DESCRIPTION OF EXEMPLARY EMBODIMENTS

Incorporated herein in their entirety are the disclosures of U.S. Pat. Nos. 7,438,220; 7,438,222; 7,438,221; 7,438,219; 7,431,204; 7,433,844; 7,431,206; 7,428,984; 7,424,972; 7,416,112; 7,418,592; 7,419,089; 7,419,093; 7,404,515; 7,405,724; and 7,392,937. These patents disclose devices and systems used to carry out banking transactions, as well as features, methods and capabilities that may be used in connection with the exemplary devices, systems and methods described herein.

Figure 1:
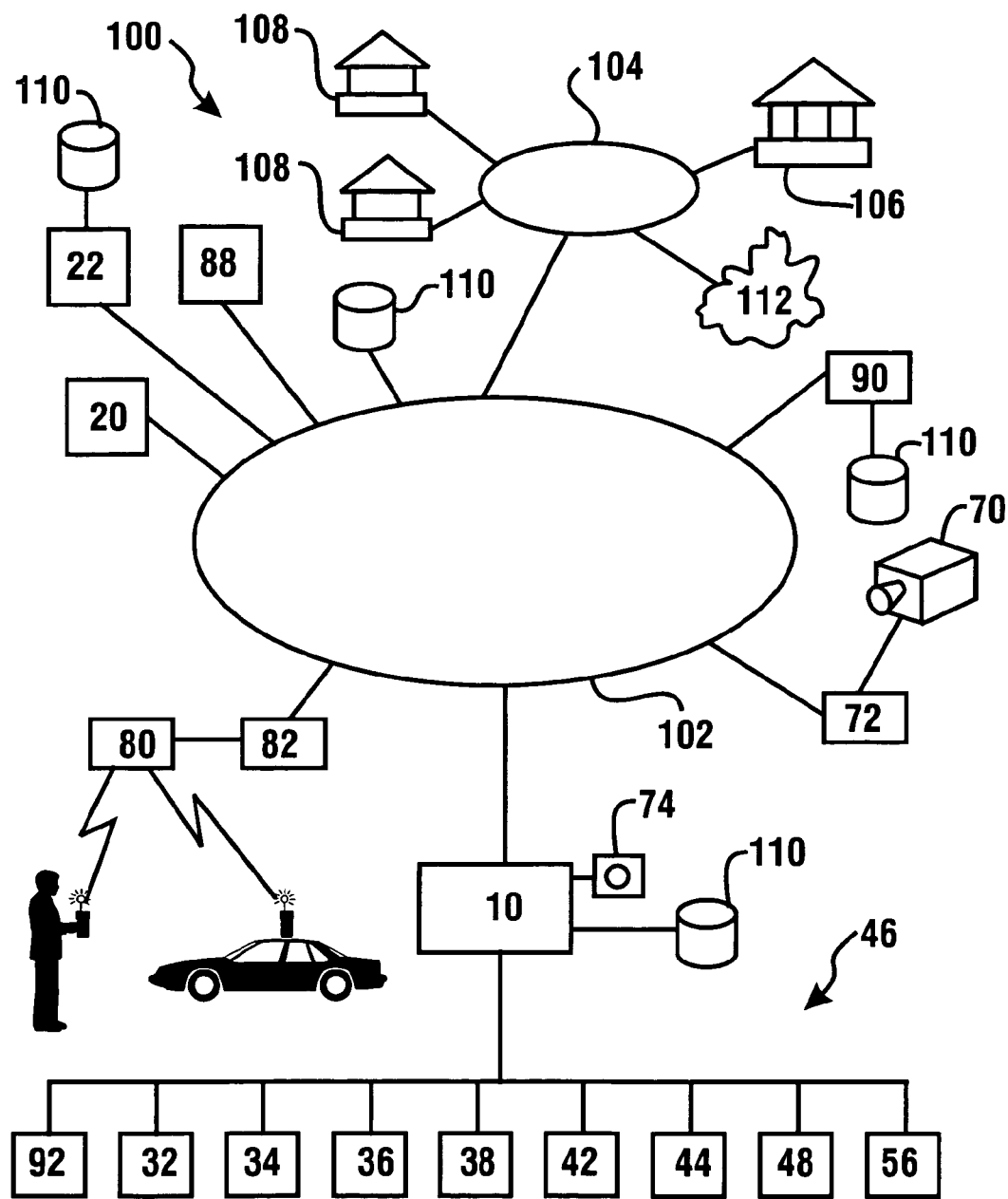
FIG. 1 is an example schematic representation of a computer system used in a banking operation.

Referring now to the drawings and particularly FIG. 1, there is shown an example schematic representation of a banking computer system 100. It should be understood that while only an exemplary number of each component of the banking computer system 100 may be shown in the exemplary banking computer system 100 of FIG. 1, in other exemplary embodiments the banking computer system 100 may contain any number of the same or different network components.

The exemplary embodiment may include a communication network 102. The network 102 may extend within a banking office building or other facility, or may be distributed among a plurality of banking office buildings or facilities. In the exemplary embodiment the network 102 comprises a data transport network environment such as a packet-switched TCP/IP-based global communication network. In the exemplary embodiment the network 102 may comprise a number of network devices such as routers, bridges, gateways, firewalls and any other device known in the art to allow the network 102 to be operable to provide communications between connected devices and systems. The network 102 may be a suitably comprised network including various message transport mechanisms such as, for example, Ethernet, Token-Ring,™, 802.11, or other wire-based or mobile-based data communication mechanisms.

The network 102 may comprise a local area network (LAN) and may be operatively connected through a larger wide area network (WAN) 104. The WAN is in operative connection to one or more computers located at a host bank facility 106 and may be operatively connected to a plurality of computers located at other banking facilities 108. The WAN or LAN may also be operatively connected to the Internet 112.

A plurality of devices operative to conduct banking or other financial transactions may be operatively connected to the exemplary network 102. A server 90 may be operatively connected to the network that includes software running therein that causes the carrying out of banking transactions, operates to manage banking databases, and carry out other programmed functions. The server 90 may be connected to one or more data stores schematically represented as data storage device 110. The network may be directly operatively connected to one or more data storage devices 110.

Teller terminals 22 may be operatively connected to the network 102. The teller terminals 22 may include computers with associated input and output devices or other devices that are operative to run software programs locally and may be connected to data storage devices 110. The exemplary teller 22 terminal may comprise a thin client software architecture in operative connection with a server running applications requested by the teller terminal 22. Alternatively the teller terminal may comprise a computer operative to run some applications locally therein while accessing other applications that are run remotely on another computer such as a server 90. In some exemplary embodiments teller terminals comprise automated banking machines. In the exemplary system, one or more banking computers 20 may be operatively connected to the exemplary network 102. A banking computer 20 may comprise one of various forms of computers, including for example, a laptop, surface computer, desktop computer, embedded computer, self service terminal, automated banking machine, or handheld device operative to run applications useful in banking transactions.

The exemplary banking system 100 contains an automated banking machine 88 that in the exemplary embodiment performs the functions of a currency exchange terminal. The currency exchange terminal is in operative connection with the network 102. The terminal operates in accordance with its programming to carry out currency exchange transactions.

A welcome terminal 10 is schematically represented in FIG. 1, and discussed in more detail later, and is operatively connected to the network 102. The terminal 10 is in operative connection with one or more data stores schematically represented by data storage device 110. The welcome terminal 10 is operatively connected to a camera 74 which is operative to capture images. The welcome terminal may include features described in U.S. Pat. No. 6,583,813, which is incorporated herein by reference. Alternatively, the welcome terminal may be in operative connection with a separate computer or system which includes the features and capabilities of the incorporated disclosure. The exemplary welcome terminal 10 includes a plurality of input and output devices 46 operatively connected to at least one computer in the welcome terminal 10. Exemplary input devices may include a keypad 32, a keyboard 34, a mouse, 36, a microphone 42, biometric input device 56, a card reader 92 and an antenna 48. Exemplary output devices may include a speaker 38 and a display 44. The welcome terminal may also include a computer input and output device such as a touch screen. The terminal may also include other types of devices for reading data bearing records, such as an RFID reader, document scanner, check reader, or other such devices for example. The welcome terminal 10 may be operative to run software locally in its computer to cause the terminal to carry out all or portions of banking customer transactions. In some embodiments, welcome terminal 10 may comprise a thin client software architecture that may cause another computer such as a server 90, to cause the execution of software applications based on inputs to the terminal. The exemplary welcome terminal may include features like those in the incorporated disclosures and may have a computer including browser software operating therein. The computer architecture may operate to interpret and generate markup language documents for purposes of sending and receiving data and interface content which is exchanged with one or more remote computers. Of course this approach is exemplary.

The welcome terminal 10 may be operative to display or communicate advertising tailored to a particular customer it may have detected and may have recognized. For example, in some exemplary embodiments the terminal may operate using features such as those described in U.S. patent application Ser. No. 11/827,966 filed Jul. 13, 2007. In such a system, for example, the user terminal may identify a user based on data read from a user card, other data bearing record that identifies the customer, and/or their financial accounts. Such identification of a customer from such inputs may be used to provide targeted output information through the welcome terminal in the manner of the incorporated disclosure. In some embodiments the welcome terminal may comprise an automated banking machine at which users can carry out transactions that include transfers of value. Some exemplary embodiments of the welcome terminals or other terminals connected in the system may include features and capabilities like those shown in U.S. patent application Ser. Nos. 10/449,096; 11/821,701; 11/899,846; 12/011,609; and 11/454,258 the disclosures of each of which are incorporated herein by reference in their entirety.

In some exemplary embodiments the exemplary banking computer system 100 may be further comprised of a plurality of cameras 70 operatively connected to one or more computers in the network. The cameras 70 may be capable of capturing a series of images. For example, the cameras may be operative to capture data corresponding to visible and/or infrared images. The cameras in the exemplary embodiment may be operatively connected to the network 102 through a camera interface device 72 which may be of the type discussed in the incorporated disclosures. The camera interface device 72 may include a suitable network interface card or similar circuitry that enables the camera to operatively communicate with other computers and devices in the schematically indicated banking computer system 100.

In some exemplary embodiments the banking computer system 100 may further contain one or more antenna 80 operatively connected to the network. The antenna 80 may be operatively connected to the network 102 through a mobile interface device 82. The mobile interface device 82 may include a suitable network interface card or similar mechanism that enables RF signals to be sent or received through the antenna 80. The interface and antenna enable RF communications with one or more computers schematically indicated banking computer system 100. The antenna 80 in the exemplary embodiment may operatively communicate with mobile devices internal or external to a banking facility such as cellular phones, laptop computers, handheld devices, and personal digital assistants (PDAs). The antenna 80 in exemplary embodiments may provide communication through one or more suitable mobile frequencies such as cellular, 802.11, and Bluetooth frequencies, for example.

For example, some exemplary embodiments may include features such as those described in U.S. Pat. Nos. 6,315,195; 6,702,181; 7,040,533; 7,201,313; 7,216,800; 6,905,072; 7,207,477; 7,418,427; 7,150,393; 7,025,256; 7,344,066; 7,392,938; and U.S. patent application Ser. No. 11/983,163 filed Nov. 7, 2007. The disclosures of each of these patents and application are incorporated herein in their entirety. The features of these incorporated disclosures may be used in connection with systems in various embodiments.

Figure 2:
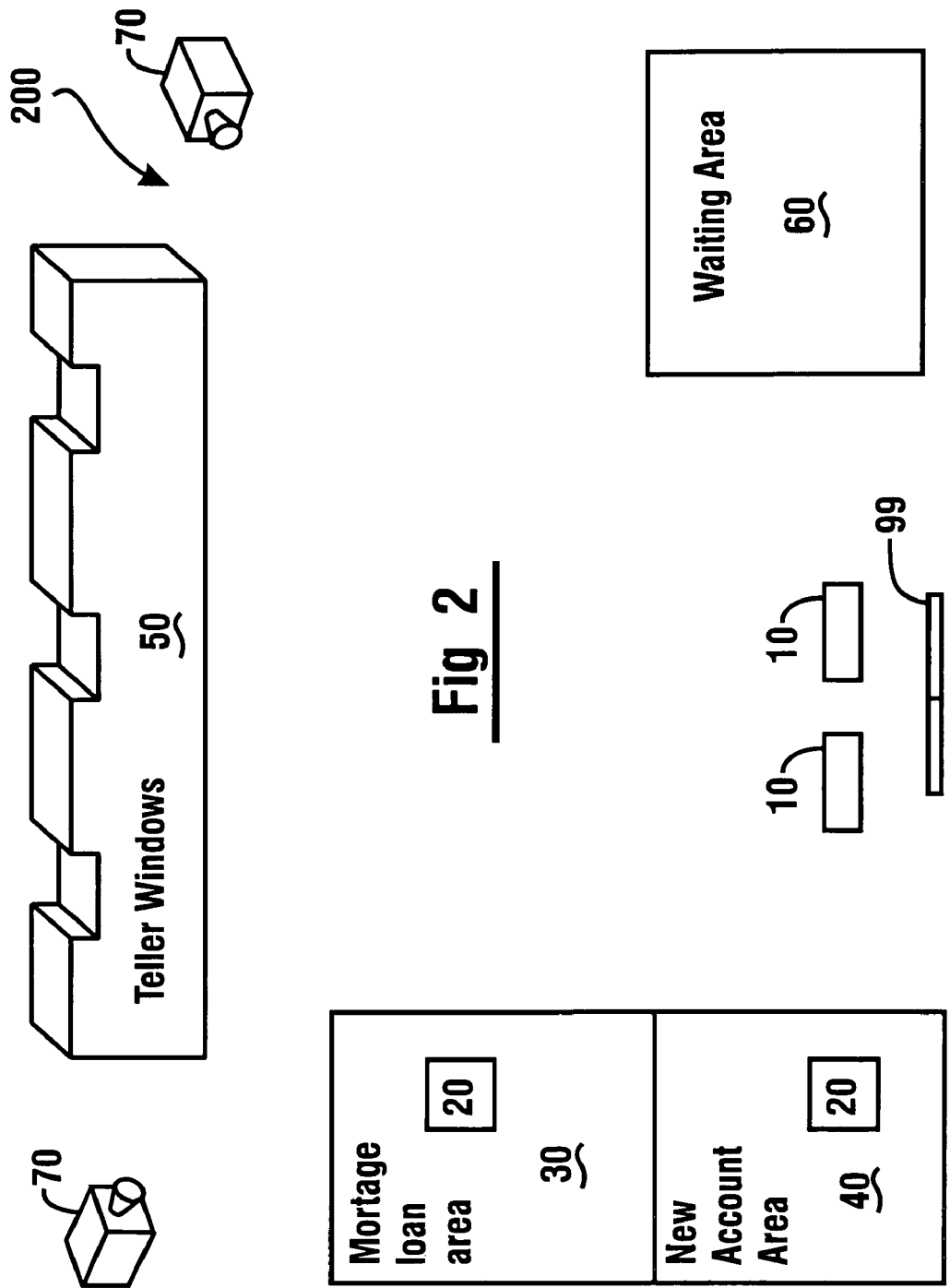
FIG. 2 is an example floor plan of the interior of a banking facility.

An exemplary floor plan of a banking facility is schematically shown in FIG. 2. In the exemplary embodiment one or more welcome terminals 10 may be placed near the front door 99 of the banking facility 200. The exemplary banking facility 200 includes a waiting area 60 where a banking customer may wait if the resources he needs to conduct the desired banking transactions are currently busy. In the exemplary arrangement for conducting transactions such as depositing checks, purchasing a certificate of deposit, or withdrawing of cash from an existing account, a plurality of resources comprising teller windows 50 may be provided. One or more of the teller windows 50 have adjacent thereto a teller terminal 22 (not shown in FIG. 2).

Such teller terminals in exemplary embodiments may be operative responsive to inputs by human tellers to assist in processing banking customer transactions. In other embodiments, the teller terminals may comprise an automated banking machine terminal that receives inputs from customers. In still other exemplary embodiments, teller terminals may include input and output devices that can be operated by both the human teller or other service provider and a customer, to carry out banking transactions. It should be understood that in exemplary embodiments the teller terminals include a computer with connected input and output devices that provide an interface to the teller and/or customer. The input and output devices are operative to cause the computer to cause the carrying out of transactions in accordance with the provided inputs. The teller terminal is also operative to communicate in the network with other computers so as to indicate activities at the teller terminal. This activity, which may be evidenced by a receipt of inputs at the terminal and/or through communications to other computers in the system, may be used to indicate the activity ongoing at the particular resource, and also that nature of such activities, to the other computers. Such information may be used in exemplary embodiments for purposes of determining through operation of the computer a time after which the teller station will become available to conduct transactions for other banking customers. Of course it should be understood that these approaches are exemplary, and in other embodiments other approaches may be used.

An office used for applying for a loan such as a mortgage or a car loan, 30, and a new account office 40 used for opening new accounts or other banking officer transactions, are shown in the exemplary embodiment of FIG. 2. Each office 30, 40 may contain a banking computer or terminal 20 operative to process transactions responsive to inputs corresponding to the appropriate customer requests. Terminals 20 may include a computer with connected input and output devices which provide a suitable interface for the input and receipt of the transaction data associated with the type of transactions to be conducted at those resources. As is the case with the previously discussed teller terminals, terminals 20 are in operative connection with other computers in a network.

The activities conducted at the terminals 20 and the messages that pass between such terminals and other computers are analyzed through operation of one or more computers in the system. Such analysis may be used to determine when the resource associated with a particular terminal is likely to become available, through operation of one or more computers connected in the system operating in accordance with programmed instructions to analyze the activities and/or messages from such terminals to make such a determination. The terminals or other computers may also be in operative connection with cameras, motions sensors, light sensors or other suitable sensors in the rooms that can provide signals indicative of when each room has persons present therein. Of course this approach is exemplary and in other embodiments other approaches may be used.

The banking facility 200 may contain cameras 70 for capturing images. The data corresponding to which images can be used for recognizing customers and tracking customers within a banking facility 200. Such cameras may be in operative connection with suitable interfaces and computers so as to enable such computers to identify and/or determine the location of persons within the facility. Connected computers may be operative to analyze such image data to determine the locations of particular individuals in various locations. This may include, for example, the number of customers waiting to use a particular resource. It may also include evaluating the number of customers in various offices or in waiting areas at automated banking machine terminals, or in other locations, so as to provide data which is used by the computers for purposes of determining how to direct customers so as to accomplish transactions in the most expeditious manner. Such information may also be used to help assure that available resources within the banking facility are utilized effectively. For example, in some embodiments one or more connected computers may operate responsive to an indication that there are multiple customers waiting to access one resource, while a service provider such as a teller or a bank officer is currently not occupied at another resource. A computer may operate in accordance with a determination that such conditions exist, to cause a message to be sent to the resource to advise the bank employee who is currently not occupied to switch to another resource location within the facility, so as to assure that transactions for customers are accomplished promptly. Of course these approaches are exemplary.

In operation, the exemplary welcome terminal 10 operates to display advertising through a display to banking customers. The welcome terminal 10 may also be operative to provide outputs that describe what banking transactions or services are available at the banking facility 200 where the welcome terminal 10 is located. The welcome terminal 10 may be positioned inside the banking location near a customer entrance. In other arrangements, the terminal may be located outside the bank in a location that may attract banking customers to cause them to provide inputs which correspond to banking transactions they may like to perform.

In some exemplary embodiments, when a banking customer approaches the welcome terminal 10 in response to one of the advertisements, the welcome terminal 10 may operate to prompt the banking customer to provide inputs responsive to the outputs through the display 44, speaker 38 and other suitable output devices corresponding to what attracted the banking customer to the advertisement. The customer may be identified by the terminal operating to read data from data bearing records which identify the customer. This may include a user card that is read through operation of a reading device in the welcome terminal. Such a user card may include a magnetic stripe card, RFID card, customer Fob, token, mobile device, passbook, fingerprint, or other data bearing record which provides data usable to identify the customer or the customer's financial accounts. In some exemplary embodiments the welcome terminal 10 is then operative to tailor a response to the banking customer to provide further detailed information of further interest to the banking customer. This may be done in the manner described in the incorporated disclosure of U.S. patent application Ser. No. 11/827,966. Of course this approach is exemplary, and in other embodiments other approaches may be used.

In some exemplary embodiments the welcome terminal 10 may be operable to use a camera 74 on the welcome terminal or other cameras 70 operatively connected to the network 102 to capture images of a banking customer at or approaching the welcome terminal. By processing the image data using image recognition software locally or such software in operative connection with other computers, the banking customer may be identified. For example, some embodiments may utilize the features described in U.S. patent application Ser. No. 11/825,553 filed Jul. 6, 2007, the disclosure of which is incorporated herein by reference in its entirety. When the banking customer is identified, information about the banking customer may be retrieved through operation of one or more computers, from a database 110. Such computers may be in a welcome terminal 10 or may be other computers connected in the banking computer system 100. By using the retrieved customer information, a personalized advertisement or other tailored messages may be presented to the banking customer through one or more output devices on the welcome terminal. In some exemplary embodiments a computer may operate to cause a personalized greeting to be displayed on the welcome terminal 10 to greet the banking customer. In other exemplary embodiments data corresponding to the most recent transactions of the banking customer may be displayed on the welcome terminal, and the welcome terminal 10 may provide outputs that prompt the banking customer to provide selected inputs if they would like to perform a transaction like one of the transactions displayed. The banking customer may then provide one or more inputs operative to select one or more transaction types they would like to perform at the banking facility 200. In an exemplary embodiment, the welcome terminal may operate in accordance with its programming to cause indicia corresponding to the desired tasks to graphically appear in a list in an area of the display 44 of the welcome terminal 10 for reference by the banking customer.

In some exemplary embodiments when the banking customer is not interested in the advertising and does not provide an identifying input in response thereto, and the customer is not recognized in another manner, the banking customer may otherwise identify himself to the welcome terminal 10. In some exemplary embodiments the banking customer may identify himself by inserting a data bearing record such as a bank or credit card into a card reader 92. In some exemplary embodiments, the user may also or alternatively enter a personal ID number (PIN) through the keypad 32 or enter a password through the keyboard 34. In some exemplary embodiments the banking customer may be identified by the welcome terminal 10 by sensing biometric data with a biometric data input device 56. Such a biometric input device may include a fingerprint reader, iris scanner, retina scan, hand scanner, voice print recognition device, or other suitable device that can recognize a biometric input associate with a user. At least one computer operatively connected in the system will then operate in accordance with its programming to analyze the received data and compare it with stored data to identify the particular user who has provided the input. In some embodiments the computer may operate to identify a user in response to multiple inputs or combinations of inputs that can be analyzed and correlated with a particular user. After a banking customer identity has been determined, the welcome terminal 10 may operate to retrieve the banking customer account information and present it to the banking customer through the display 44 or other output device, for example.

If the banking customer is not recognized and not verified, he may be prompted to provide inputs indicating what type of new customer banking product or service he may be interested in. In some exemplary embodiments the new customer may be shown on a welcome terminal 10 output device indicia corresponding to types of accounts the banking customer may open that the banking location 200. The new banking customer may be prompted with account information tailored to the type of account that the banking customer selected. The welcome terminal may also operate to output indicia corresponding to other types of banking transactions and services which are offered by the banking facility. The banking customer may provide inputs to the terminal indicating the type of transaction or service in which the customer is interested. In some exemplary embodiments when a possible new banking customer is detected, an image of the banking customer may be captured responsive to operation of one or more computers in the banking computer system 100. The image is sent to a terminal or other output device in proximity to a banking employee to allow the banking employee to offer a more personal welcome greeting to the banking customer.

In some exemplary embodiments when an existing customer or a new customer has provided inputs to the welcome terminal 10 indicating a request to open an account or process a banking transaction, the banking customer may be prompted through outputs from the welcome terminal to begin entering customer information at the welcome terminal 10 related to the activity or transaction that the banking customer is capable of entering. The information may include the name, address, phone number, income history and other personal information of the banking customer pertinent to the requested transaction. If the banking customer is an existing or former customer, then the personal data of that customer may be retrieved through operation of one or more computers from a database on the computer network 100. The data associated with the banking customer may be used at the welcome terminal 10 to supply data for the requested transaction along with data the banking customer has entered at the welcome terminal 10. For example in some exemplary embodiments, the welcome terminal may operate in accordance with its computer's programming to provide an output that asks the banking customer to confirm information that is retrieved through operation of the bank's computer from the data store. In this way, information that has changed can be updated. This might include, for example, contact information for the user, including information such as new cell phone numbers, email addresses, a mailing address or other information that may be helpful in terms of providing services to the customer.

In some exemplary embodiments the welcome terminal 10 may be in operative communication with a pre-transaction processing system that includes task analyzer software, task queuing manager software, and way finding software. In some exemplary embodiments portions of each of these software functions may reside on different banking computers or computers in resources in the banking computer system 100, which are operable to execute software instructions. In some exemplary embodiments the banking computer system 100 architecture may be balanced and the software and corresponding databases 110 distributed among operatively connected computers in a way that allows for a banking computer system 100 that has high throughput of customer transactions and reasonable banking computer system 100 costs. Of course those approaches may be used in different embodiments.

In some exemplary embodiments task analyzer software is operative to analyze the desired banking transactions identified by a banking customer and determine which tasks (if any) a banking resource could currently begin. For example, if the banking customer indicated they wanted to do a transfer and apply for a home equity line of credit, a banking system computer may begin to execute steps in accordance with its programming to process the home equity line of credit first. The banking resource such as a computer terminal located in the office to which the customer will eventually be directed to review and sign loan papers may begin to operate in response to communication with one or more other computers to begin to populate the forms with data that is available in connected databases in the banking system. Thus the banking resource that will be associated with the transaction will begin to take the steps necessary to open the home equity line of credit to the extent possible without customer or banking officer involvement. When the banking customer is later directed to the home equity loan officer, the home equity loan officer would already have some of the necessary work completed. The capability of pre-processing banking customer banking transactions may produce a more pleasant, efficient and integrated banking experience for the banking customer. The bank may benefit in reduced employee cost and with less resources needed to process banking customer transactions. Of course this approach is exemplary, and in other embodiments other approaches may be used.

In some exemplary embodiments task queuing manager software would be operative to determine how the requested banking transactions may most efficiently be completed. In the exemplary embodiment the task queuing manager software may dynamically determine the best and most efficient way to prompt the banking customer on how to accomplish the requested transactions. For example, a banking customer may indicate a desire to perform two types of transactions. One transaction may be performed at a currency exchange terminal 88 rather than the welcome station. The second transaction may need a banking employee teller to accomplish the task (purchase a certificate of deposit, for example). The task queuing manager software may be operative in real-time to look at the availability of the two banking resources required. If it is discovered that the currency exchange terminal 88 was not being used at that time, but all the teller stations operating were currently busy, the banking customer would be directed through outputs from the welcome terminal to the currency exchange terminal 88 to perform that banking transaction first.

The banking customer may be directed to the currency exchange terminal 88 by displaying a prompt on the display 44 of the welcome terminal 10. The banking customer may also be presented a map output on the display 44 showing how to proceed from the welcome terminal 10 to the currency exchange terminal 88. At the same time, the banking customer may be placed in a "virtual queue" for a teller station. When the banking customer finishes the currency exchange transaction, the currency exchange terminal 88 may then be operative responsive to messages from the computer establishing the virtual queue to direct the banking customer to the appropriate teller station.

A teller at the station to which the customer is directed may be expecting a banking customer with any "pre-work" already completed. Such work may be accomplished through communications between the teller terminal at the particular teller station and one or more computers which are operative to accomplish the necessary processing steps associated with the transaction type which the customer indicated the customer wished to conduct through inputs at the welcome terminal. The task analyzer software discussed earlier operates to cause the banking teller terminal in conjunction with the teller at that station to accomplish the preliminary work. Alternatively, if the currency exchange terminal 10 was not immediately available but a teller station was available, then the task queuing manager software would be operative to direct the banking customer to proceed to the banking teller station and then the customer would then be directed to the currency exchange terminal 88 after the transaction at the teller station was completed.

In the exemplary embodiment the way finding software may be operative to analyze outputs from the queuing manager software. In some exemplary embodiments the way finding software may be operable to generate outputs that include directions that may be presented to the banking customer on resources which include devices operatively connected in the banking network 102. The directions may be presented to the banking customer through a display in the welcome terminal 10, currency exchange terminal 88, banking terminal, a display at a teller location 50, waiting area 60, a display surface of a surface computer, or any device location through which a banking customer may receive directions. Other resources within the banking facility may include transaction stations such as those described in patent application Ser. Nos. 10/390,342 filed Mar. 17, 2003, and/or 11/100,148 filed Apr. 5, 2005, the disclosures of each of which are incorporated herein by reference in their entirety. Such resources may also include terminals used in connection with accessing facilities such as safety deposit box areas in vaults such as those described in application Ser. No. 12/004,758 filed Dec. 21, 2007, the disclosure of which is also incorporated herein by reference in its entirety. In addition, in some exemplary embodiments resources may include transaction stations located in walk-through or drive-through lanes associated with the banking facility. These may include systems such as those described in patent application Ser. No. 11/825,752 filed Jul. 9, 2007, the disclosure of which is incorporated herein by reference in its entirety. Of course these resources, devices, features and functions are exemplary, and in other embodiments other approaches may be used.

In some exemplary embodiments the directions to customers may be provided in audio format from any location which includes a suitable output device from which a banking customer may receive audio directions. In exemplary embodiments the directions may be output to allow a banking customer to find the way to the next destination which has a resource to complete the next in a series of banking transactions the customer wishes to conduct. For example, when the queuing system software determined the banking customer was to proceed to the currency exchange terminal 88, the way-finding analyzer would operate using data corresponding to that destination along with data corresponding to the known current location at which the banking customer is interacting with other devices on the banking system 100, to resolve a route for the banking customer to follow. A route may be shown graphically to the banking customer in the form of a map in the context of the floor plan of the banking facility 200. In some exemplary embodiments the map may be displayed on an output device on a resource or through output devices where the banking customer is currently located in the banking facility.

In other embodiments, outputs including a map may be provided to a user through a mobile device. This mobile device may be of the type supplied to the customer by the banking facility to facilitate user transactions. Such a device may include a device that a customer may receive from the welcome terminal or from a bank employee for use only during the time that the banking customer is in the bank. Alternatively, the banking customer may be provided with a fob, token or other suitable device which includes an indicator or output device which the banking customer may retain when the banking customer is outside the bank. Further in alternative embodiments, directions and other information may be delivered to a customer's portable phone or other mobile device so as to facilitate the customer's movement efficiently between resources in the banking facility. Of course these approaches are exemplary.

In some exemplary embodiments computers in the system may operate so there is coordination with the destination point for a customer. An output device may be operated so a message may be displayed at the location of the resource, such as "reserved for (customer name) . . . " or "welcome Mr. (customer name)." Alternatively, the computers may operate to facilitate maintaining the customer's privacy. This may include providing outputs on a display that include only the customer's first name and last initial. Alternatively, a display may include only initials. Further in some embodiments other customer identifiers may be used that further maintain anonymity of the customer. These may include numerical or character designators which are associated with outputs provided to the customer through the welcome terminal or other resources, or through a customer's mobile device. After a banking transaction is complete at the first destination or resource, the way finding software may cause output of a map or information showing the banking customer how to proceed to the next destination.

In some exemplary embodiments banking resources such as automated teller machines, the teller terminal 22 and the banking computers 20 may be operative to run workflow analysis software, customer awareness software, and image tracking software. In some exemplary embodiments portions of each of the workflow analysis software, customer awareness software, and image tracking software may reside on different computerized banking resources in the banking computer system 100 operable to execute software instructions. Of course these approaches are exemplary, and other types of systems, software architectures, and concentrated or distributing processing systems may be used.

In some exemplary embodiments the workflow analyzer software may be operable to receive outputs from the task analyzer software discussed earlier, and may be operative to define what steps a human teller will need to perform in order to complete the selected transaction for the customer. In some exemplary embodiments after the task analyzer software resolves the steps needed to execute a banking transaction, it may provide outputs to the teller (or other appropriate bank personnel) on a display device corresponding to those items and/or action steps that apply to the task. For example, if the requested banking transaction is to open a certificate of deposit, the workflow analyzer software may prompt on an output device of the banking employee's terminal, to carry out only those items that adhere to the business rules associated with opening a certificate of deposit. In the exemplary embodiments the workflow analyzer software may be operative to present as outputs to the banking employee only the forms and procedures that pertain to opening the certificate of deposit. In the exemplary embodiment forms and procedures may come to the banking employee with data already populated into an electronic form that was generated and/or processed earlier from the task analysis software phase and populated with information that may have earlier been collected at the welcome terminal 10 or gathered through operation of a computer in connection with one or more data stores in the system that include the customer's information.

In some exemplary embodiments the banking customer awareness software may alert the appropriate bank employees to certain information about customers that may currently be in the banking facility 200. For example, if an individual that is not identified as a current customer indicated at the welcome terminal 10 an interest in opening a checking account, the welcome terminal 10 may operate to capture an image of that customer and cause that image to be conveyed to a banking customer awareness software function. In the exemplary embodiment the banking customer awareness software may make a bank employee aware of where that banking customer was directed go and transmit that image to an output device so the employee may see what the banking customer looked like. In some exemplary embodiments computers connected in the system may operate responsive to their programmed instructions to cause outputs to a selected banking employee's terminal which include visual information which indicates, for example, "Customer #1 is interested in opening a checking account and was told to go to the waiting area . . . and the banking customer looks like 'this'<shows their picture>." With that information, a bank employee may go to the waiting area to greet the new customer in a more personal manner because the bank employee already knows who to approach. For example, the bank employee is now enabled to say: "Hello. My name is Bob Jones and I understand you'd like to open an account with us. Please let me take you to our new accounts manager." In alternative systems, bank employees may be provided with mobile terminals which include suitable output devices for receiving messages and pictures. Computers connected in the system may operate in accordance with their programming to send messages via wireless communication to the particular employee's mobile terminal which identifies the customer and provides the information on the customer and the type of transaction that customer would like to conduct. This approach enables the bank employees to be roaming and still receive the information. Of course this approach is exemplary, and in other embodiments other approaches may be used.

In some exemplary embodiments the image tracking software may be operative to track banking customers and/or bank employees wherever they were relative to the floor plan of the banking facility 200. For example, if a banking customer was directed to proceed to a waiting area and the banking customer never made it to the waiting area because the banking customer may have been distracted by a friend in another area of the lobby, the bank employee may not be able to greet the customer. In some exemplary embodiments the banking customer tracking may be accomplished by utilizing the image data captured through video surveillance of the entire banking facility 200. A video stream of the floor area from all the cameras may be fed to image tracking software running in one or more computers.

In the exemplary embodiment all the points of customer interaction may be recorded as data values stored in memory associated with a computer so those points are known relative to customer positions on the floor of the facility. For example, the welcome terminal 10 may be at a floor grid with coordinates E7. When the image tracking software determines that Customer #1 has provided inputs that correspond to a request to open a banking account at the welcome terminal 10, the welcome terminal may provide that data to the computer running the person image tracking software. In some exemplary embodiments the image tracking software is then operative to cause data to be generated that corresponds to the location of the Customer #1 being at the welcome terminal 10 which corresponds to coordinate E7. Next, the image tracking software operates to track Customer #1 as the customer moves from one camera 70 field of view to another. The cameras 70 may feed image data corresponding to the real-time movement of the customer to the image tracking software which may use a mapping function to overlay the coordinates of each customer being tracked on a floor plan of the branch. The computer may operate to output this "live" information to bank personnel through output devices operatively connected to the computer through an animated graphic with customer names, privileges, reference numbers, or other data shown attached to the moving objects.

In an exemplary embodiment if the bank employee does not find Customer #1 in the waiting area 60, the employee may provide an input to a handheld device and data corresponding to an animated map of customer movement within the lobby could be sent to the handheld device of the bank employee. With information about where Customer #1 is located on a layout of the banking facility 200, the banking employee may now approach Customer #1 and great them in a proper manner.

In other exemplary embodiments the banking customers may be tracked by capturing and processing image data which is analyzed by one or more computers that identify the particular customer by various properties that can be sensed by sensors and devices in operative connection with the computer. In some exemplary embodiments the banking customer may be tracked using signals from a plurality of sensors positioned in an array throughout the banking facility 200 floor. Sensors in the floor may sense the weight of a banking customer and how that weight is distributed to various portions of the footprint of a banking customer as the banking customer moves about the banking facility 200. The sensors may also or alternatively include an array of photo sensors. The sensors are in operative connection with one or more computers. The computers operate to analyze the data from the sensors indicating the weight that is currently sensed thereon and/or the interruption of photo sensor beams. The computer may then operate to track the user from the known starting point throughout the area of the bank where the sensors are located. In some other exemplary embodiments the shoe print of a banking customer may be captured with cameras at a low level or in the banking facility 200 floor. In exemplary embodiments, low height level cameras may operate to identify an image of a customer's shoe as associated with that particular customer. The image of the shoe may be analyzed and recorded such that when the image of that shoe is seen by other cameras, the computer operates to identify a particular customer that is associated with the shoe image. The banking customer may then be tracked within the banking facility 200 by tracking his shoe image. It should be understood that in other embodiments other articles on or associated with customers could be used for tracking the customer within the banking facility. This may include articles of clothing, items of jewelry, or other identifiable features that will remain associated with the particular customer through the customer's activities at the bank facility.

In other exemplary embodiments a banking customer may be tracked by a unique signal emitted from a mobile device the banking customer carries. A plurality of sensors may detect the unique mobile signal and that signal may be triangulated within the banking facility 200 to determine the location of the banking customer. In yet some other embodiments a banking customer may be tracked by sensors and software operative to detect biometric data such as readable scanning features of the eye or facial features as the banking customer arrives and moves within the banking facility 200.

Some exemplary embodiments may include special areas within a banking facility reserved for a segment of banking customers with "high net-worth customers" that are of high value to the banking facility. The explanation of a banking customer segment here will use "high net-worth customers" and services they find of value, but the use of a banking customer segment may be used to identify other groups of people with common transaction characteristics, such as small business customers, or safe-deposit customers, for example.

In some exemplary embodiments the use of a personal identification device may be used to identify a banking customer segment to the bank or even individual customers of high interest or value. In some exemplary embodiments the personal identification device may comprise a device that is specifically issued to the customer who is within the customer segment or category. For example in some embodiments, the personal identification device may comprise a fob, card or other article that is operative to emit or provide one or more unique signals or data that identify the customer. For example in some embodiments, the personal identification device may include an RFID device which is operative to provide a unique signal that identifies the customer. Such an RFID device may include articles such as a credit or debit card which includes an RFID indicator thereon. Alternatively, the article may include a token, fob or other item that a user may include on the user's person when traveling to the banking facility. Of course these approaches are exemplary.

When a person in the segment is detected upon their approaching or arriving at the banking facility, the banking facility and banking computer system may be operative to identify the banking customer by matching the signals emitted or output by the person's identification device with data stored in at least one data store. In some exemplary embodiments once the banking customer is identified, the banking facility may begin to prepare the banking environment for services that particular person, or a person in a particular customer segment, typically desire. This may include, for example, providing outputs on display devices or at the customer terminal acknowledging the customer by name. Alternatively or in addition, at least one computer may be operative to communicate with a computer terminal or a portable device carried by a banking employee. The communications with the portable device or the bank employee computer may be operative to advise the employee of the identify of the customer approaching the bank, and advise the employee to greet the customer. Further in some exemplary embodiments, the computer may be operative to recover data corresponding to an image of a customer that is displayed to the bank employee. This will facilitate the employee identifying the customer so that the employee can personally greet the customer as the customer enters or approaches the bank. In some exemplary embodiments detection of the personal identification device may also be operative to begin execution of the previously discussed software routines like the way finding software, queuing manager software, and task analyzer software.

In some exemplary embodiments the personal identification device may be a biometrically enabled device. The biometric personal identification device may only become active when the person to whom it has been registered has personal possession of the device and provides a unique biometric input. For example, the personal identification device may only be operative to output one or more signals for a period of time after a user has provided an input such as a fingerprint over a scanner included on the device. Alternatively in some embodiments, the identification device may respond to a user's voice print or other perceptible input to cause it to provide the identifying output. In some exemplary embodiments when the personal device is active it may emit a radio frequency signal that may be detected by one or more receiving devices that are operative to receive the signal and operatively communicate data corresponding to the signal to the banking computer system of the banking facility when the customer approaches or enters the facility.

In some exemplary embodiments upon being detected, a particular banking customer or a person belonging to a specific banking customer segment would have a space reserved for them (a private financial consultation room, for example) allowing them to proceed directly to that space. This may include, for example, the computer operating in accordance with an instruction to activate an output device to indicate the customer's name or other identifier on an output device associated with the private meeting room. One or more sensors adjacent to the meeting room may operate to unlock a door or other access control device as the user's identification device is sensed in proximity to the door. In some exemplary embodiments after a reservation was in place for a particular customer, no other banking customer could use that room even if they also had a similar device. In some exemplary embodiments once the banking customer for whom the room was reserved for enters the room, they may again need to identify themselves with the device or otherwise before they may proceed with the special services. This may be accompanied by one or more sensors sensing the device within the room. Alternatively or in addition, the user could further identify themselves through a secondary form of authentication. This could take the form of providing inputs to an input device, such as a card reader reading a card, an input of a PIN number through a keypad, or a biometric input. Of course these approaches are exemplary, and in other embodiments other approaches may be used.

Figure 3:
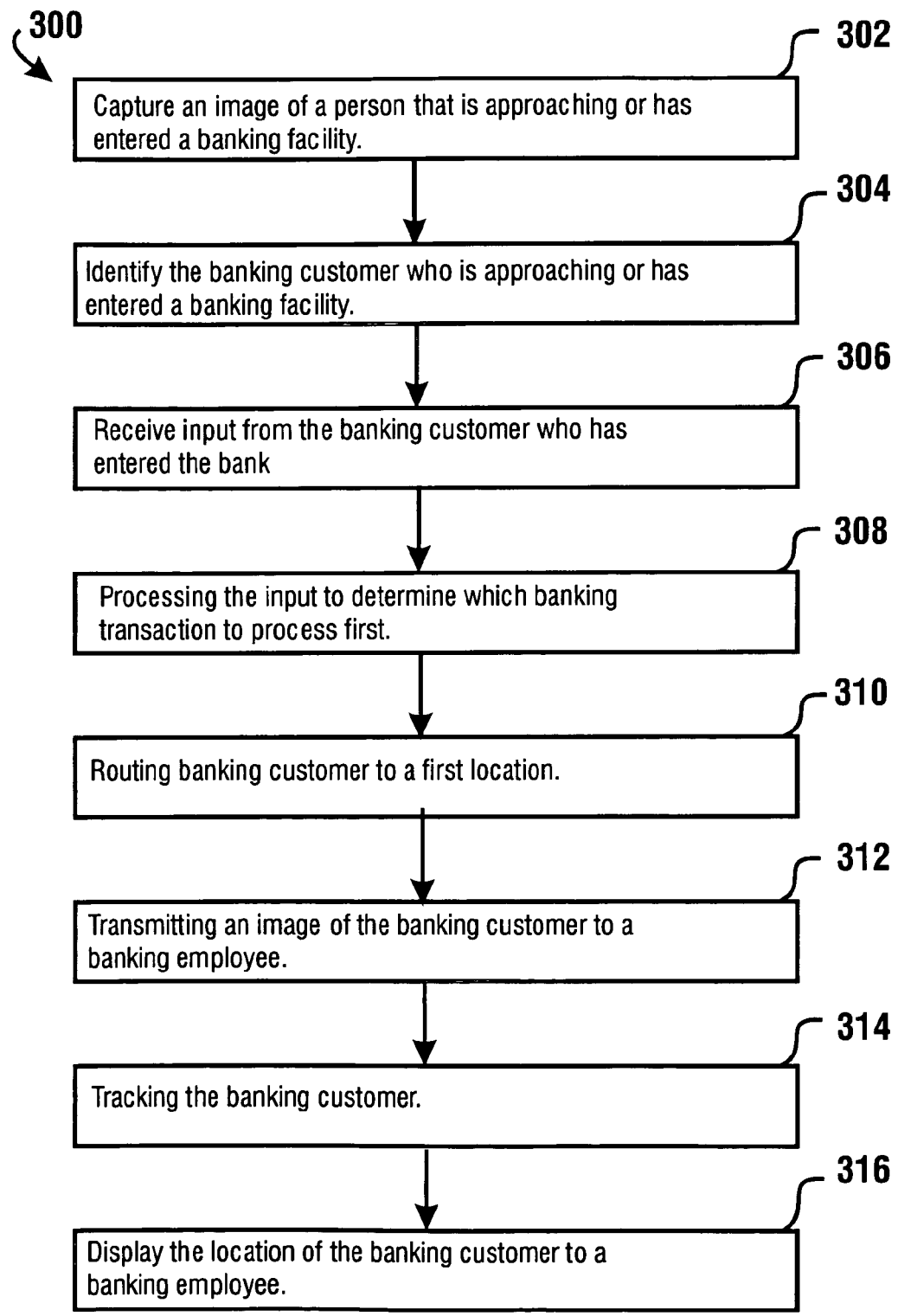
FIGS. 3 and 4 are schematic diagrams of a method associated with processing banking customer transactions using a welcome terminal.

FIG. 3 shows schematically an exemplary method of processing banking transactions using a welcome terminal 300. The method may include a step 302 where an image of a banking customer approaching or at a banking terminal may be captured through operation of one or more computers. The image may be optical or of any method that may be useful to identify or track the banking customer. The banking customer may be identified in step 304. The identification may be by computer analysis of optical images, facial images, infrared images or any other method to identify the banking customer. At step 306 input may be received at a welcome terminal located near the bank entrance from a banking customer that has entered a bank. The input may include information about the types of transactions the banking customer wants to perform at the banking facility 200. In some exemplary embodiments the banking customer may now begin entering data corresponding to the types of transactions the banking customer would like to transact. At step 308 the input received from the banking customer is analyzed through operation of a computer to determine which transaction may be processed first. The determination may be made by a banking computer system determining which resources are needed for each requested transaction and which of the needed resources are then currently available. The banking customer may be routed to a first location at step 310 through outputs from the welcome terminal and/or other devices. In some exemplary embodiments one or more computers may operate to present the banking customer with a map at the welcome terminal displaying how to proceed to the first location. At step 312 an image of the banking customer may be transmitted through operation of one or more computers to a computer or other output device accessible to a bank employee. The image may be used by the bank employee to personally greet the banking customer or to find the banking customer. The banking customer may be tracked in step 314. The tracking may be performed by the banking computer system through one or more of the approaches as discussed above. At step 316 the location of the tracked banking customer is presented to a banking employee through one or more output devices such as a computer display or a portable handheld terminal. The displayed location may enable a banking employee to more easily find the banking customer.

Figure 4:
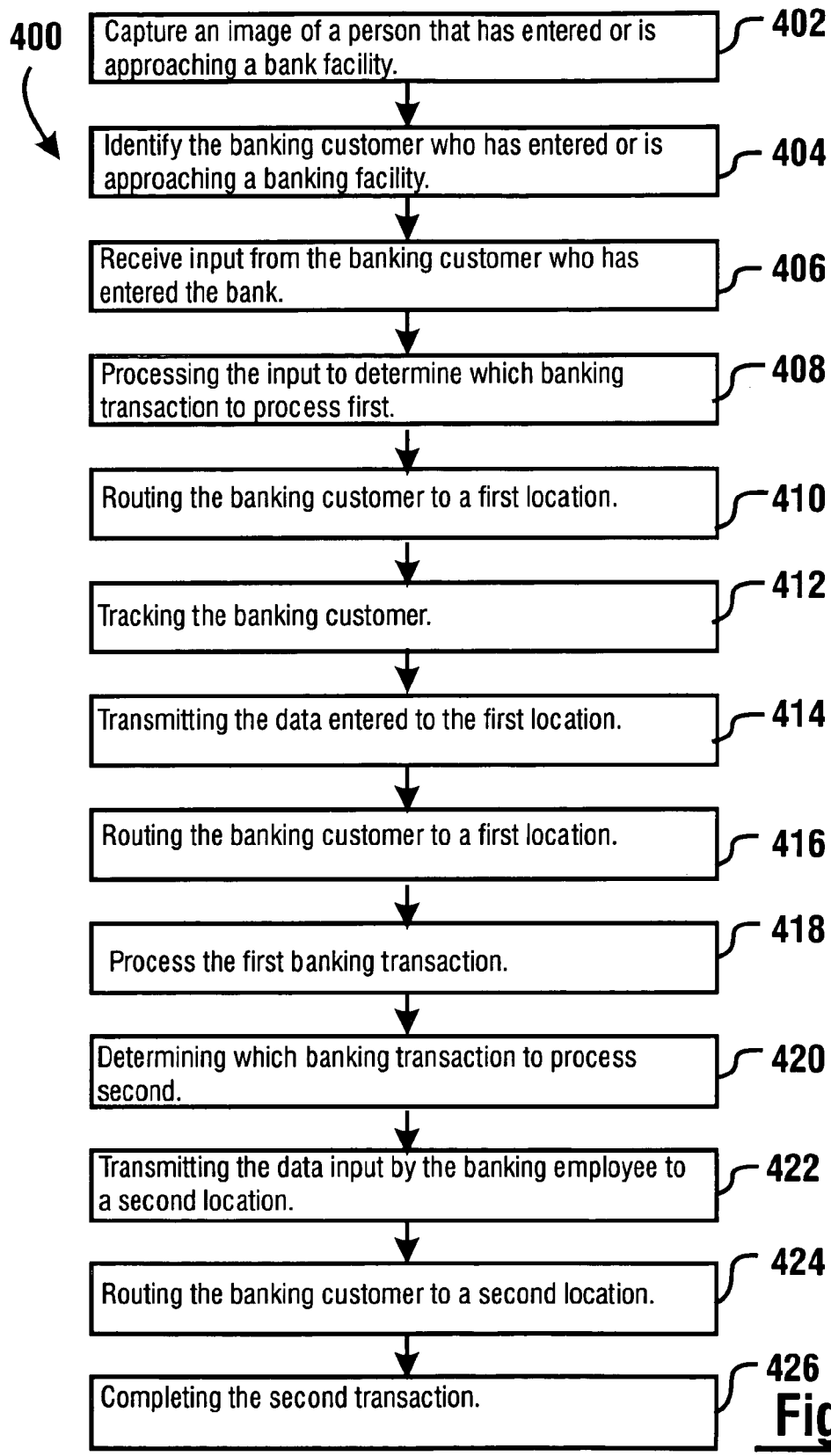

FIG. 4 schematically represents an exemplary method of processing banking transactions using a welcome terminal 400. The first five steps of the exemplary method may be identical to the first five steps of the method in FIG. 3. At the sixth step 412, the banking customer may be tracked through operation of one or more computers. At step 414 the data the banking customer may have entered into the welcome terminal is communicated to one or more computers that are operative to analyze and/or communicate the customer data to a resource at a first location where the customer is being directed to carry out a transaction. A banking resource such as a computer terminal or other device at the first location operates to begin processing the first transaction before the banking customer arrives at the first location. At step 416 the banking customer may be presented information through the welcome terminal or other output device about how to get to the first location. The first banking transaction is processed at step 418. This is accomplished by the customer interacting with the banking resource at the first location. This may include, for example, providing inputs to terminal devices either by the customer or human operator, or other activities as are necessary to carry out the transaction. At step 420 a determination is made through operation of a computer as to which banking transaction may be processed second. The determination may be made by the computer or computers in a similar manner as was the determination to determine the first transaction in step 408. One or more computers operate to cause data corresponding to the customer and/or the selected transaction which is to be processed second to be transmitted to the banking resource at the second location in step 422, which may allow the second transaction processing to begin before the banking customer arrives at the second location. At step 424 the banking customer is routed to the second location by the first resource or other manner, and the second transaction is completed at step 426. If there are more transactions, then step 420 through 424 may be repeated for each transaction until all transactions are completed.

In some exemplary embodiments rather than waiting until a banking customer has arrived at a welcome terminal, the banking customer may contact the banking facility before arriving at the bank, through the customer's mobile device. This may be done by the mobile device communicating with one or more computers in the banking network. This may be done, for example, through a cell phone connection or other wireless communication methodology. In some exemplary embodiments some of the functions of the welcome terminal discussed above, such as identifying a banking customer, may be accomplished by the messages from (i.e., an originating phone number or network address of) the mobile device. This may include, for example, receiving from the customer suitable identifying inputs through the mobile device. The identifying inputs are transmitted to one or more computers and compared to stored data so that the customer may be identified. One or more computers in the banking network may operate to generate and cause to be presented on the mobile device a list of the banking transactions a banking customer may desire to perform. The customer may operate the mobile device to provide inputs which correspond to the one or more banking transactions which the customer desires to perform. This may be done through operation of the mobile device and software operating therein, as a result of communications with one or more computers in the banking system. Such inputs may cause one or more computers of the banking system to begin preprocessing or other activities to prepare for the transactions that the banking customer will conduct when the customer arrives at the banking facility.

In some exemplary embodiments the mobile device may comprise a personal device such as a mobile phone or PDA. In some exemplary embodiments a mobile device may connect with the banking computer system through any mobile system including cellular, Wi-Fi, WiMax or 802.11. Of course these are exemplary.

After a mobile device is in operative connection with a computer in the banking network, it may be used to pre-order financial services or banking transactions from wherever and whenever the banking customer desired. In some exemplary embodiments the pre-ordered transactions or services may then be processed through operation of the computers at a convenient time and place before the banking customer needs them completed or arrives at a banking facility. If the banking customer does not need the transaction completed that day or later that day, the banking computer system may schedule the transactions to be completed at a future time, or completed to the extent possible until the banking customer arrives at a banking location.

For example, a customer may have a mobile device that can be used to communicate with one or more computers in the banking system, and has 10 checks the customer wishes to deposit. The banking customer may enable an application on their handheld device to begin to operate and communicate with one or more computers in the banking computer system. In some exemplary embodiments portions of the mobile application may reside in the mobile device or on computers in a banking computer system. In some exemplary embodiments the mobile software application may be text message based, or may communicate using a web application.

Using a mobile device, the banking customer may provide one or more inputs to identify themselves and enter a personal identification number (PIN) in private. In some exemplary embodiments the transaction sequence carried out through operation of the mobile device interface may be similar to the transaction sequence described above with a welcome terminal, except that it is being conducted on a mobile device. The banking customer may select from a menu output on a display of the mobile device to "deposit checks" at a branch. The mobile device may then operate to cause data corresponding to the customer's selections to be communicated to one or more computers in the banking computer system. The banking computer system may then provide communications to the mobile device that cause the device to instruct the banking customer how to proceed to the nearest banking facility 200 location that may accommodate the desired transactions. The banking customer may be prompted through outputs that include a map or directions to the banking facility 200.

The banking customer arrives later at the banking location to which the customer was directed. In some exemplary embodiments the presence of the banking customer may be detected at the banking facility 200 through operation of the mobile device. In some exemplary embodiments a signal such as an RFID, Bluetooth, or other radio signal may output by the device and detected by the banking computer system. In some exemplary embodiments when the banking computer system detects the arrival of the banking customer, the banking computer system may process the banking transactions the banking customer requested earlier using the task analyzer software and queuing manager software as previously discussed.

In some exemplary embodiments the banking computer system may operate in accordance with its programming to identify the resource that is available to perform the requested transactions and may direct the banking customer through outputs from the banking customer's mobile device where in the branch to proceed. In some exemplary embodiments the mobile device may receive communications that direct the banking customer and cause the device to output a map or floor plan of the banking facility. This may be accomplished in a manner similar to the maps shown on the welcome terminal discussed earlier. In some exemplary embodiments the banking customer may be prompted responsive to software similar to the operation of the way finding software discussed earlier to cause the mobile device to present a map accompanied with a message such as "Please proceed to Check Deposit Terminal #1." In some exemplary embodiments "Terminal #1" may be reserved by providing an output that includes the name of the banking customer. This may be done, for example, by the computer system operating to cause an output through an output device adjacent to or on the terminal, which output indicates the customer name or other identifying information for the customer. Of course this approach is exemplary, and in other embodiments other approaches may be used.

In some exemplary embodiments when the banking customer arrives at the terminal, they may press an application button on their mobile device or provide another type input that operates to inform the banking computer system they are at the indicated location. The banking computer system may generate a verification message for one-time use and display the message on the terminal where the banking customer should now be located. The banking computer system may then operate to instruct the banking customer through their mobile device to enter a one-time message that the banking computer generated, as inputs into the banking customer's mobile device. If the banking customer enters the verification message, this is received by one or more computers and operates to verify to the banking computer system that the banking customer is at the targeted terminal. In some exemplary embodiments the banking customer is from this time instructed through the mobile device, the terminal, or both, to refer to instructions on the terminal's display to execute the physical check deposit into the automated banking machine terminal. Once the checks are deposited, the check images and summary information may be compiled into an electronic acknowledgment. One or more computers in the banking system operate to cause to be transmitted to the banking customer mobile device a record of the transaction.

In another example, a small businessman places a request from his mobile device to pick up his cash drawer money for the day (banded bills and rolled coins) in a drive-up lane. The small businessman may complete a mobile-based ordering transaction similar to the first example and indicate his desire to pick up his order at a pneumatic tube terminal, which is also referred to as a VAT terminal in a drive-up environment. This may be done through inputs to the user's mobile phone. The mobile phone is operative to communicate data corresponding to the inputs wirelessly to one or more computers in the banking system. The banking system is operative responsive to its programming to cause one or more computers to analyze the inputs and determine what steps should be taken prior to the customer's arrival to accomplish the customer's desired transactions. When the small businessman arrives in the parking lot, he may be detected automatically as discussed above. Alternatively, the customer may be detected by a camera system that captures images and that is in operative connection with a computer that operates facial recognition software. Of course these approaches are exemplary. The detection initiates a queuing function in at least one computer and may reactivate the computer processing data corresponding to the pending transaction. The businessman is queued for the cash pickup transaction for "Lane #1" and is instructed to proceed to that lane on his mobile device. This is done responsive to operation of one or more computers which provide outputs that are wirelessly transmitted to the customer's mobile device. The mobile device is operative to output instructions to the customer through its display or other output device.

Once the businessman arrives in the correct lane, he may press an application button on his mobile device or otherwise provide inputs to indicate to the system he is in position. The system is operative to generate a one-time use pass code, transmits it and causes it to be output to the customer, who may view it on his mobile device. The output through the mobile device may be operative to prompt the customer to enter the one-time use pass code into a keypad or other input device positioned adjacent to or on a customer terminal of a pneumatic tube transport system. For purposes of this disclosure, a pneumatic tube transport system is also referred to as a "VAT" system. The input of the code through the input device is operative to indicate to one or more computers in the system that the businessman is where he should be and may receive the currency.

The computer system operates in response to the one-time use input to cause the requested funds to be delivered to the customer through the pneumatic tube system. This may be done, for example, by the computer operating to cause one or more outputs through an output device associated with a resource such as a teller terminal. In response to such an output, a teller may collect the desired items and place them in a pneumatic tube carrier for transmission to the customer. Alternatively in other embodiments, an automated device which may be of the type in the incorporated disclosure operates to collect the desired items and place them in a carrier on an automated basis which is transmitted through the pneumatic tube system to the customer. In still other embodiments, the one or more computers in the banking system may communicate with devices such as cash dispensers and rolled coin dispensers to make available the items that have been requested by the customer, so that either a human teller or an automated system may cause them to be placed in and delivered to the pneumatic tube system. Of course these approaches are exemplary, and in other embodiments other approaches may be used.

In some exemplary embodiments a banking customer may be issued a banking card when the banking customer opens an account at the banking location. The banking card may be operatively used to identify the banking customer to the welcome terminal or remote automated banking machines or ATMs. The banking card may be operative to identify a banking customer to a mobile device used by banking employees before the mobile device is authorized to request or conduct transactions within the banking facility 200. The banking card may include one or more features therein or thereon that are operative to provide outputs that identify the customer. These may include, for example, an RFID tag that is operative to provide data which can be used to identify the customer. In other embodiments the card may include a memory chip or other memory device which holds data that can be used to identify the customer. In still other embodiments the card may include a magnetic stripe which has data encoded thereon that can be used to identify the customer. Numerous different types of data storage arrangements may be used in various embodiments. Further it should be understood for purposes of this discussion, a card may include other articles of a small and portable variety that may be suitable to provide identifying inputs associated with a customer.

Figure 5:
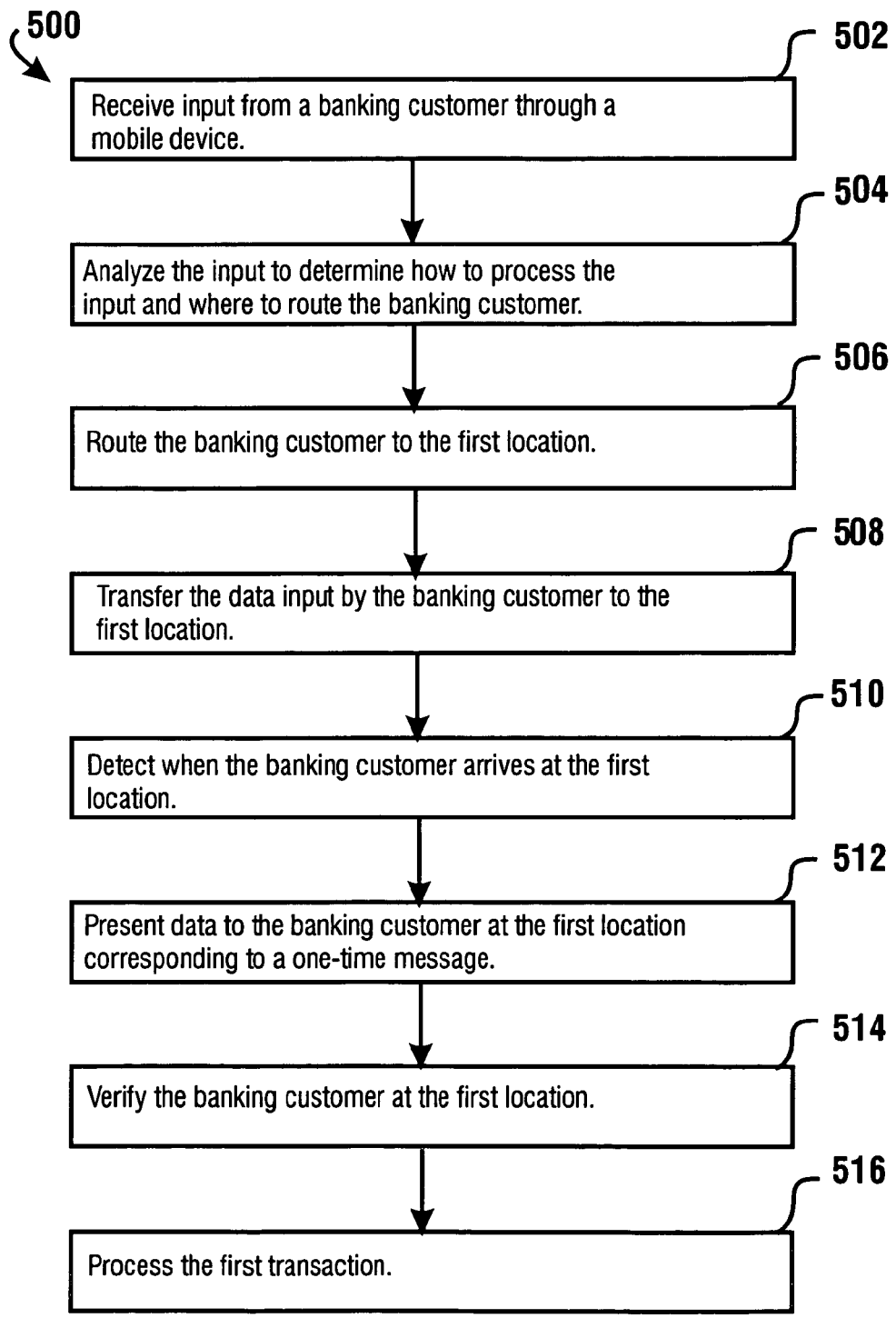
FIG. 5 is a schematic diagram of a method associated with processing banking customer transaction requests made from a mobile device.

FIG. 5 shows a schematic representation of an exemplary method of processing banking transactions in a system that includes a welcome terminal 500. The method may include a step 502 where one or more inputs are received from a banking customer through an input device included on a mobile device. The input may be received before the banking customer arrives at a bank and may contain information about the types of transactions the banking customer would like to perform. Data corresponding to the one or more inputs is transmitted through wireless communication to one or more computers included in the banking computer system. At step 504 the input is analyzed through operation of one or more computers to determine which one of a plurality of banking transactions requested by the customer will be processed first and where to route the banking customer once the customer arrives at the bank. The banking customer is routed to a first location in step 506. This is done through communication between one or more computers in the system and the mobile device. The mobile device provides outputs to indicate to the customer where the customer is to go. Alternatively, the customer may be provided with outputs through other output devices that are perceivable in the area where the customer is located, either inside or outside of the banking facility. This may include, for example, beginning to prepare necessary items for delivery to the customer through operation of a self service terminal or automated banking machine. Alternatively it may include the generation of electronic and/or paper forms through operation of a computer terminal. In other embodiments it may include the generation of other items by a service provider in response to outputs from a teller terminal or other terminal device.

In step 508 data entered by the banking customer is transmitted through operation of at least one computer to a first location. The first location may correspond to the banking resource that will handle the first banking transaction. Transferring the data to the first location may allow the first banking transaction processing to begin by the resource before the banking customer arrives at the first transaction location. At step 510 the banking customer may be detected when they arrive at the bank location. This may be done, for example, by detecting the presence of the customer's mobile device at the bank location by sensing RF signals or other signals emitted from the device. Alternatively, detecting the customer at the bank may be accomplished through image analysis based on images captured by cameras and processed through one or more computers to identify a facial or other image associated with the customer. In still other embodiments other identifying aspects associated with the customer, such as the customer's unique identification card or other article, may be sensed. Of course these approaches are exemplary.

At the first location a one-time message or password may be presented to the banking customer in step 512. The one-time message may be generated through operation of one or more computers in response to their programming. The one-time message may be communicated to a device such as a self-service terminal or other resource that the customer is to utilize in carrying out the customer's transaction. The customer may then input the one time message. The message is input by the customer to the customer's mobile phone. The message included as part of the message from the mobile device is communicated through operation of the mobile device to one or more computers in the banking system. In accordance with their programming, one or more computers are operative to compare the input message received from the mobile device to the one-time message generated by the system. In some exemplary embodiments the computer is also operative to analyze the source of the communication, such as the particular mobile device and/or the location of the mobile device, based on outputs which can be detected by the system. This may include, for example, the system determining the phone number, network address, or other identifying data associated with the mobile device to confirm that it is the mobile device of the customer. Likewise, GPS or other tracking data may be used to determine the location of the particular mobile device from which the input is received.

In response to one or more computers in the system determining that the data input through the mobile device corresponds to the customer and the indicated output code, the at least one computer is operative to cause outputs or operations at the particular banking resource that cause the customer's requested transaction to occur. At step 514 a verification determination is made that the banking customer is at the first location. The verification may include prompting the banking customer to enter the one-time message into a mobile device used by the banking customer and analyzing related data. At step the first 516 transaction is processed.

In an alternative exemplary embodiment the banking computer system may be used to generate personal messages to a banking customer. As a banking customer approaches the bank, welcome terminal, teller terminal, automated banking machine, or other resource location a banking customer may approach to conduct a banking transaction, the banking computer system may be operative to identify the banking customer. The banking customer may be identified by any of the methods described above, for example image recognition by devices recording images of persons in the banking facility. When the banking customer is identified through operation of one or more computers, data associated with that customer may be retrieved from one or more data stores. Data is used by the banking computer system to cause to be produced, a personal greeting or other messages to the banking customer.

In some exemplary embodiments a database of personal information for each banking customer may be in operative connection with the banking computer system. Information, such as data corresponding to the history of the transactions the banking customer conducted at the bank, may be saved in the database. Other information such as the height, weight, hair style, clothes worn, visual images, hobbies, political views, family history, jewelry, health history, previous banking responses, special interests the banking customer may have, and other personnel information may be saved in a database. The banking computer system may be operative responsive to image data captured through one or more cameras to recognize the face, image, clothes, hair, jewelry, watch, shoes, responses and actions of a banking customer during visits to a banking facility and store data corresponding to this information in a banking database for future reference.

In some exemplary embodiments the current mood of a banking customer may be operatively determined through operation of the banking computer system. This may be done by analyzing the customer's actions, motions, body language, facial expression or other detectable parameters. If, for example, it is detected that the customer is acting in ways that suggest the customer is in a hurry, the computer may cause the banking resource such as a self service terminal to provide outputs more rapidly, provide outputs that are shorter, or eliminate promotional messages and take other steps to cause the terminal to operate more promptly consistent with the customer's determined status as in a hurry. Alternatively or in addition, the customer might be presented with the option through an output device on one or more banking resources such as an automated banking machine or a self service terminal, to indicate that the customer is in a hurry to complete the transaction. When this occurs, one or more computers either within the terminal or outside the terminal may operate in accordance with their programming to take steps such as those previously discussed to cause the transaction to be completed more quickly. Of course these approaches are exemplary.

In some exemplary embodiments the greeting or response may be displayed on a screen of a display device of a welcome terminal or other device in the form of text. Alternatively, the greeting or response message may be presented on a screen in the form of a virtual person speaking the message with a corresponding computer generated audio voice output. In some exemplary embodiments the greeting or response may be presented by a device that projects a realistic three-dimensional image of a person speaking the personal message or response message responsive to operation of one or more computers. In some exemplary embodiments the device may be operative to project a holographic image of a person.

In some exemplary embodiments the banking computer system is operative to determine, based on stored data, the age of the banking customer. The computer operates to cause an image of a simulated person of similar age to be displayed to the banking customer on an output device. In some exemplary embodiments the banking computer system may be operative to make a determination of a kind of person likely to put the banking customer most at ease, based on stored data. The at least one computer is operative responsive to this data to display the image of this type of person to the banking customer for welcoming and responding to the banking customer. Of course these approaches are exemplary.

In some exemplary embodiments the greeting or other messages output to the banking customer may be tailored to changes in the appearance of the banking customer. Records of past banking visits may be retrieved from a database. Past data on the clothes, wrist watches, shoes, hair styles, weight, jewelry, and/or other data of interest pertaining to the banking customer may be retrieved. In some exemplary embodiments if the banking computer system detects any change in this data, a personal greeting or response to the banking customer may be generated through one or more computers that compliments the banking customer on the change. In some exemplary embodiments the banking computer system may analyze image data to detect and identify family members or other people accompanying the banking customer. The computer may be operative to generate personal greetings and responses to the family members or other persons accompanying customers. In some exemplary embodiments a greeting or response to the banking customer may be generated responsive to image data and/or other information about the people accompanying the banking customer.

In some exemplary embodiments data on pets of the banking customer may be obtained from one or more sources and stored in a data store in operative connection with the system. In response to identifying the particular customer, one or more computers may be operative to access the data corresponding to the particular customer's pet or pets. The computer may then operate to include in the personal messages to the customer comments or messages about the particular customer's pet or pets.

In some exemplary embodiments one or more computers in the banking system may operate to analyze the data concerning the customer and make a determination that the customer has certain characteristics which cause that customer to be classified within a particular category or group. In some exemplary groups the classification may correspond to social status. In other exemplary embodiments, the classification associated with the customer may indicate that the customer is not a native English speaker. In other exemplary embodiments the classification may indicate that the customer has a particular disability and require outputs of a particular type from automated banking machines in order to utilize those machines. Based on this determination as to the category in which the particular customer is classified, the one or more computers is operative to provide outputs to devices through banking resources that correspond to the particular classification.

In some exemplary embodiments the banking computer system is operatively connected to one or more databases with information on the current weather data, recent news stories, and sporting event results, for example. This information may be used by one or more computers to generate a greeting or personal responses to a banking customer tailored based on such data. In some exemplary embodiments the banking computer system is adapted to analyze the images of the banking customer and to recognize movements or other detectable indications that the banking customer is in need of medical care. This might include analysis of image data that indicates that a customer is doubled over, is listing, is shaking, or has fallen, for example. The greeting message and responses may be tailored to the medical care needs. If the banking customer is in need of urgent medical care the banking computer system may operate to send one or more messages to bank personnel or to a hospital or an ambulance requesting assistance for the banking customer.

Figure 6:
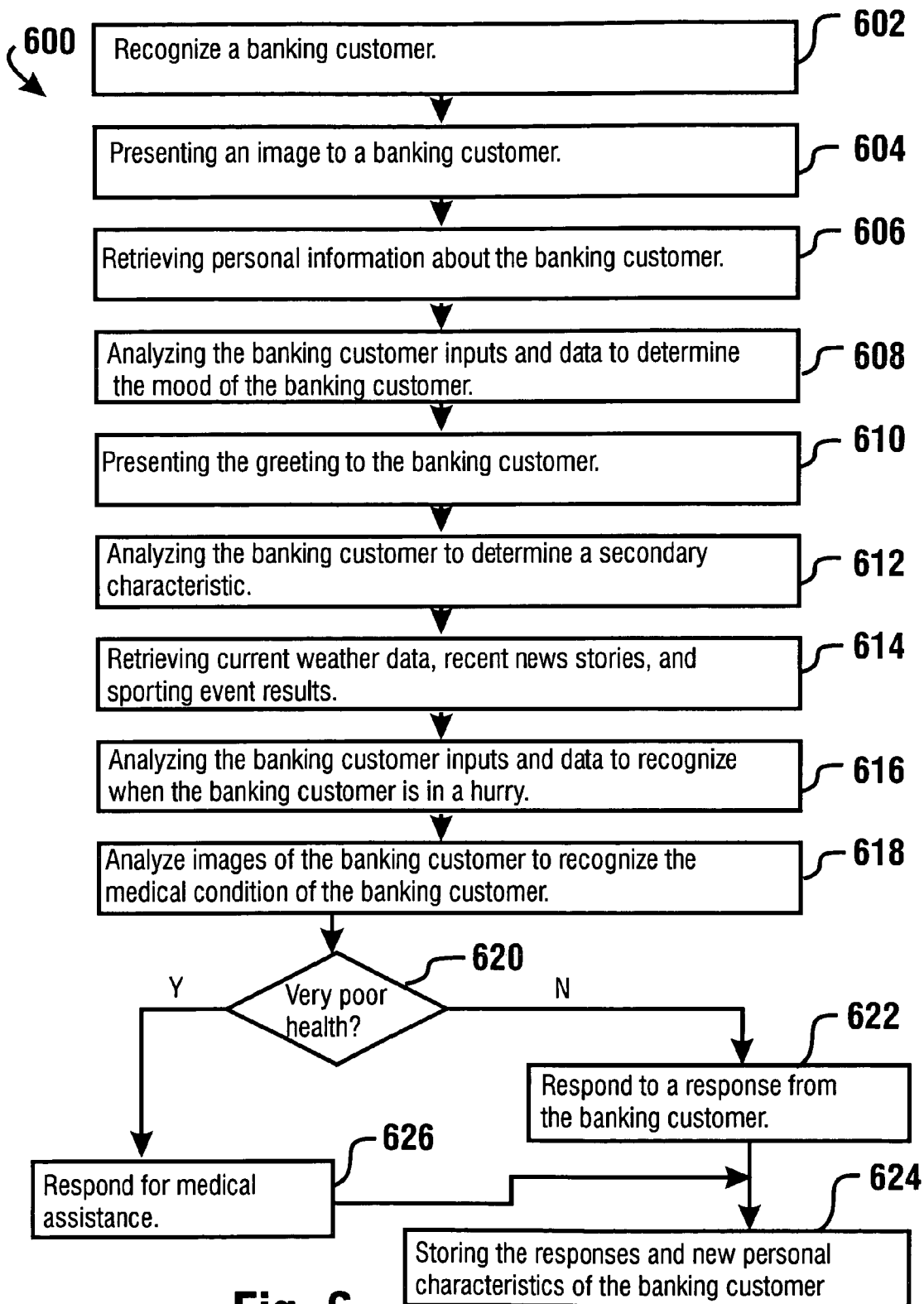
FIG. 6 is a schematic diagram of a method associated with processing banking transactions using a surface computer.

FIG. 6 is a schematic representation of an exemplary method of processing banking transactions 600. The method begins at step 602 by identifying a banking customer. The banking customer may be recognized when the customer arrives at the bank. This may be done through operation of one or more computers, based on received data in one or more of the ways previously discussed. At step 604 the banking customer is presented an image through an output device. The image may be a personalized welcoming image and may be presented in one or more of the ways described above. At step 606 personal data about the banking customer is retrieved from a database of personal information in connection with the banking computer system. At step 608 the images, inputs or other available data or properties associated with the banking customer, or the inputs the customer has recently provided to devices connected to the computers, is analyzed to determine the mood of the banking customer. The data is analyzed through operation of one or more computers to determine one or more properties corresponding to a probable mood of the banking customer. The computer then operates responsive to the resolved probable mood data to generate a greeting to the banking customer which corresponds to the result of the analysis. At step 610 the banking customer is presented with the greeting. The greeting may be personalized to the banking customer and may be tailored to the resolved data concerning the mood of the banking customer.

At step 612 one or more images of the banking customer may be analyzed to recognize a secondary characteristic. Secondary characteristics may include for example, clothes, hair, jewelry, wrist watches, shoes or other perceivable features associated with the banking customer. When a secondary characteristic is detected, the computer may operate to provide messages to the banking customer tailored to the secondary characteristic. At step 614 data corresponding to current weather data, recent news stories, and sporting event results may be retrieved through operation of one or more computers. This data may be retrieved from one or more data stores included in the banking system. Alternatively such data may be retrieved from an external source such as sources accessible through the Internet or other operatively connected network. This data may be used by one or more computers to generate messages to the banking customer. At step 616 data corresponding to images, movement, properties, inputs, tone of voice, or other data associated with the banking customer may be analyzed to make a determination as to when the banking customer is in a hurry. In some cases the customer may provide an input in response to an output message from the welcome terminal or an automated banking machine asking the customer to provide one or more inputs to indicate that the customer is in a hurry. When it is resolved or otherwise determined that the banking customer is in a hurry, the computer may operate to cause outputs, wait time, or information provided to a customer to be shorter, or the computer may operate to eliminate the display or provision of advertising, additional queries, or output of other information that might be provided when a customer is determined not to be in a hurry.

At step 620 images, movement, characteristics or properties associated with detectable aspects of the banking customer are analyzed to determine a probable medical problem of the banking customer. If the banking customer appears to have a medical problem, one or more computers are operative to generate a request for medical assistance at step 626. If the banking customer does not appear to have a medical problem, one or more computers are operative to generate a response to a banking customer as represented at step 622. At step 624 a database of personal information corresponding to the banking customer is updated responsive to operation of one or more computers based on the responses and new personal characteristics of the banking customer.

Figure 15:
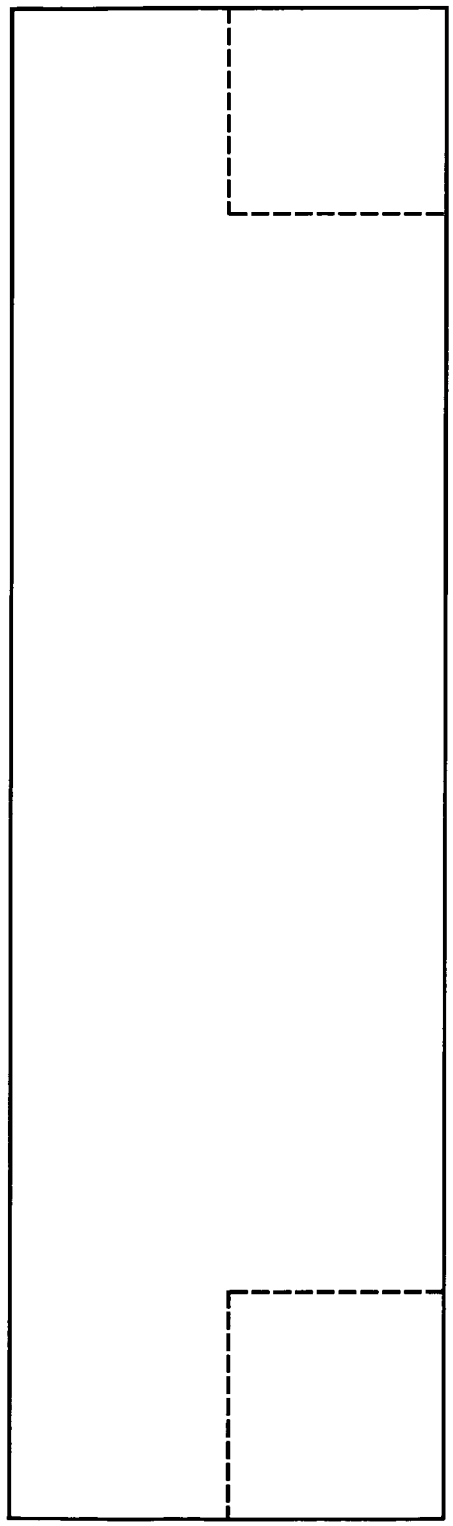
FIG. 15 is an example of an automated banking machine touch screen interface including at least two disposed user locations.

In some exemplary embodiments a surface computer may be operative to process customer banking transactions. The surface computer may be operatively connected to the network 102 of FIG. 1. For purposes of this disclosure, a surface computer will be deemed to be a computer including a large, generally planar display surface. Through such a display surface multiple users may at the same time or during a single transaction session or during overlapping transaction sessions, receive visible outputs from the display surface and provide inputs to through physical contact with the display surface. In an exemplary embodiment the surface may comprise a surface which provides a visible output while at the same time enables the receipt of inputs from multiple users through contact with the surface in disposed areas. In some embodiments the display surface may comprise a large single touch screen panel, while in other embodiments the display surface may include a plurality of such panels arranged to have the surface thereof in generally a single plane. FIG. 15 shows an example of a display surface. The areas bounded by broken lines in FIG. 15 represent user locations.

In some exemplary embodiments the surface computer operates in accordance with its programming to allow a banking customer to display indicia corresponding to banking services to be output through a display surface of the surface computer, and to allow a banking customer to organize and compare the accessed banking services. A surface computer may be in operative connection with one or more cameras or other devices that operate to sense the then current position of the user's face and/or eyes. This may be done through software which is operative to analyze data corresponding to such features. In such exemplary embodiments when a person selects banking data to be displayed with the surface computer, the computer is operative to cause the display surface of the surface computer, based on where on the display surface the banking customer appears to be looking, to display the data at that location. The surface computer is operative to allow the banking customer to compare and sort indicia corresponding to different features of the displayed banking services and to select one of the banking services to be performed through contact with the display surface. The surface computer may also be operative to enable a banking customer to display, sort and select indicia corresponding to icons or other indicia output through the display surface to carry out transactions such as a review of banking account information and to open a banking account. The exemplary surface computer interface is adapted to allow a banking customer to touch, slide a finger and tap the surface computer with a finger when organizing, comparing and selecting data. The touch, sliding and tapping of the surface computer surface is operative to cause the opening, closing, rotating, flipping, stretching and shrinking of indicia and data displayed on the display surface responsive to operation of the computer.

In some exemplary embodiments the surface computer may have the display surface included as all or part of a desktop or a wall surface. In some exemplary embodiments the surface computer may receive inputs that enable the computer to identify the banking customer and operate to automatically access information stored in a banking database about banking transactions that the identified customer commonly performs. For example in some embodiments, images of the banking customer may be captured by cameras located within the display surface of the surface computer. The banking customer images may be analyzed by a computer running facial recognition software. The facial recognition software operating in the surface computer may operate to identify the customer and provide outputs or other information in response thereto. In other embodiments a surface computer may receive inputs through the display surface such as biometric inputs. Such inputs may include, for example, a fingerprint scan or hand scan. The data which is input may be used to identify the customer. Of course these approaches are exemplary, and in other embodiments other approaches may be used.

In some exemplary embodiments the banking customer may be recognized by sensors that capture data that enables the computer to recognize that a mobile device placed on or adjacent to the display surface of the surface computer belongs to a particular banking customer. This may be done through sensors that are operative to capture image data or other visible data of the mobile device that identifies it as belonging to a particular user. Alternatively or in addition, the display surface may include other sensors which are operative to sense other characteristics of items. This may include cards, passbooks, checks, tokens, fobs or the like. Further, in still other embodiments, the surface computer may be in operative connection with an input device such as a wireless input device. The wireless input device may receive inputs from a mobile device or other article carried by the user that provides data that can be used by one or more computers to identify the user. Of course these approaches are exemplary.

The surface computer may be adapted to recognize the cell phone, laptop computer or personal digital assistant of a banking customer. The surface computer may include an interface that enables the banking customer to transfer data from a mobile device to the surface computer, and the surface computer may be adapted to allow the banking customer to transfer data from the surface computer to a mobile device. This may be done, for example in some embodiments, by an optical interface that enables sensors included in the display surface to read data output on a screen associated with a mobile device. Alternatively the data interface may include transmission of data through optical signals that are exchanged between the mobile device and the display surface or other interface that is in operative connection with the surface computer.

In some exemplary embodiments the surface computer may be operative to allow data to be transferred to the mobile device by providing an interface to allow a banking customer to touch an icon on the display surface and drag the icon to a zone adjacent to or around the mobile data device while the mobile device is on or touching the display surface. The surface computer may operate to allow a banking customer to access existing banking account information of the banking customer and to display the account information on the display surface. In some exemplary embodiments the surface computer is operative to automatically retrieve banking customer data from a portable mobile device the banking customer may have placed near the surface computer. Of course these approaches are exemplary.

Figure 7:
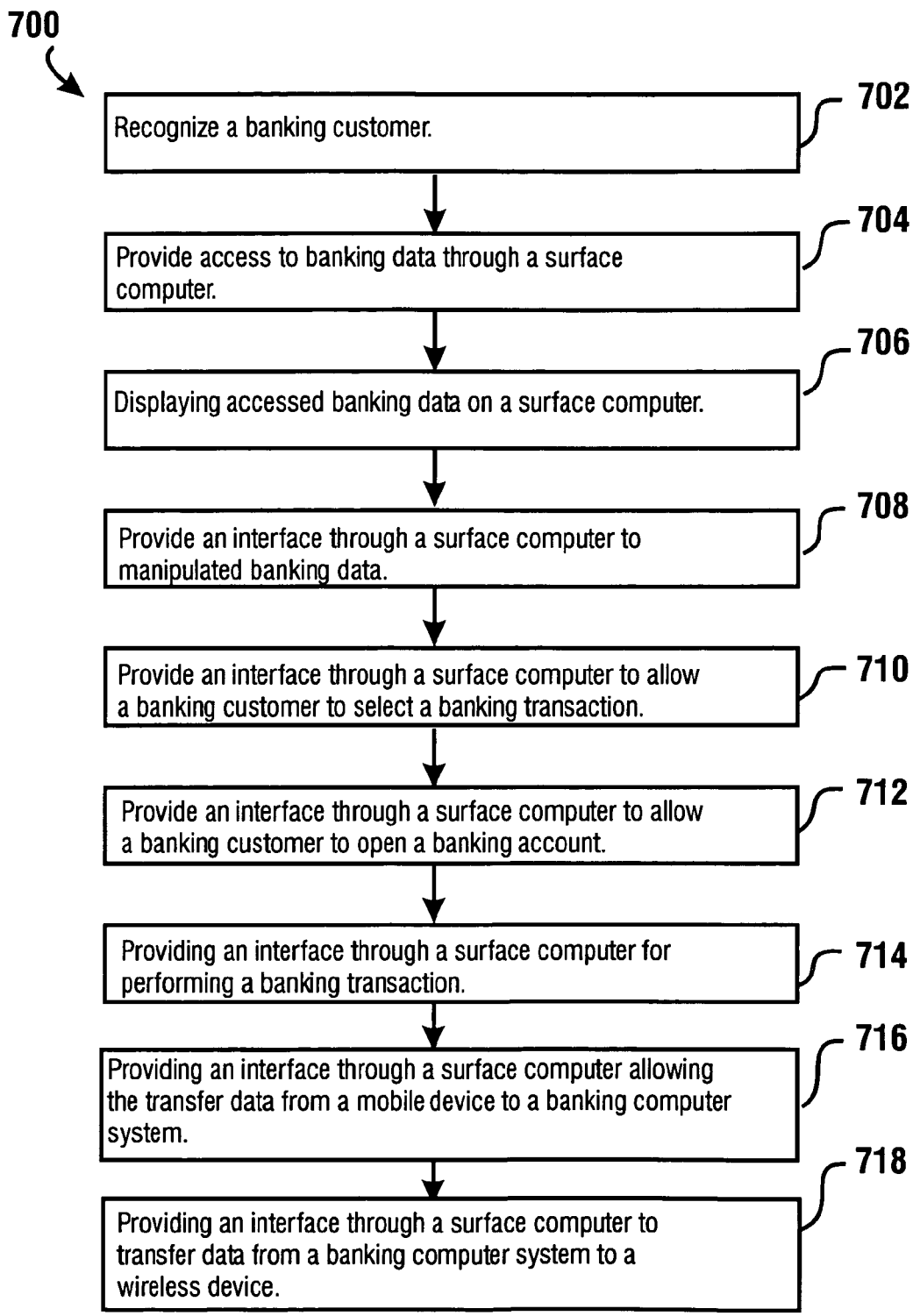
FIG. 7 is a schematic diagram of a method associated with processing banking transactions in a manner personal to the customer.

FIG. 7 schematically represents an exemplary method of processing banking transactions using a surface computer 700. The method begins at step 702 by identifying a banking customer. The banking customer may be recognized through image data captured by devices within the display surface of the surface computer or by image capture devices operatively connected thereto. Such customer recognition may be accomplished by capturing images of the customer's face, thumbprint, or other biometric features. One or more computers including the surface computer may operate to identify the user based on one or more biometric features. Alternatively, a user may be identified based on an article or signals output by or sensed from the article, such as the user's mobile device, token, passbook, check, checkbook, card or other item that is uniquely associated with the customer.

The computer receives data corresponding to the one or more inputs and operates to determine if the received inputs have a corresponding relationship to data stored in at least one data store in operative connection with the computer. In response to determining that the received data corresponds to stored data for a particular customer, the computer operates to determine the customer's identity and to resolve that the identified customer is to be authorized to conduct transactions through the surface computer. At step 704 access is provided that allows banking data to be accessed by the identified customer through the surface computer. The computer operates responsive to the one or more inputs received through the display surface to cause data to be retrieved which corresponds to that requested by the computer's inputs. At step 706 the data that is received responsive to the inputs is displayed on the surface computer. At step 708 an interface is provided through the display surface of the computer to allow a banking customer to organize and compare indicia corresponding to the accessed banking services. At step 710 an interface is provided through the surface computer to allow a banking customer to provide one or more inputs operative to select a banking transaction. At step 712 an interface is provided through the surface computer to allow a banking customer to open a bank account. An interface to allow the performance of a banking transaction is provided at step 714. At step 716 an interface through the surface computer is provided to allow the transfer data from a mobile device to a banking computer system. At step 718 an interface is provided through the surface computer to transfer data from a banking computer system to the surface computer may be provided. Thus as can be appreciated, the surface computer may provide various interfaces through the display surface that enable the provision of outputs and the receipt of inputs that cause selected transactions for users to be carried out. Of course these approaches are exemplary.

In some exemplary embodiments a surface computer may be combined with one or more transaction function devices to provide an automated banking machine with transaction capabilities that users may perform on a self service basis. This may include for example, providing devices that can accept bills and/or checks in an area within or below the display surface of the surface computer. For example in some embodiments a device capable of receiving bills and/or checks through an opening, may be positioned with the opening extending in a wall or other surface vertically below a portion of the display surface. Such a device may be operative to receive bills and checks from a user in some embodiments. Further in other embodiments such a device may be operative to dispense currency bills to users. Further in some embodiments several such devices may be positioned in laterally spaced relation below a generally continuous display surface which extends vertically and horizontally in a plane on or in connection with a wall.

In some exemplary embodiments transactions may be conducted using the principles previously described. A user may move adjacent to the display surface of the surface computer in general alignment with the opening of such a device. Such activity may be facilitated by including an output through the display surface in such an area. Further as discussed previously, some embodiments may provide an output including a customer name or identifier based on a particular area of the display surface being determined by a computer as the transaction resource a customer is to use to conduct a transaction. In response to the output, the customer may approach the surface computer and provide the inputs required to accomplish a transaction. This may include for example, the customer providing a card input, biometric input, numerical input, password, PIN or code input, mobile device input, or other input of the types previously described which can be used to identify the particular customer and/or that the particular customer is at that location of the surface computer. In some arrangements, the surface computer may provide virtual buttons, a keypad, a keyboard, a dial or other virtual component output through the display surface, which the user can contact, touch and/or manipulate in order to provide identifying or other inputs. In other embodiments the display surface may include a card reader opening for a card reader. The card reader may be mounted behind the opening. In other embodiments a card reader can be mounted adjacent to the display surface. In other embodiments a contactless card reader may be mounted in or behind the display surface. Of course these approaches are exemplary.

Responsive to having determined that the particular customer is at the location at the display surface, one or more computers may be operative to cause the surface computer to provide outputs appropriate for the particular user. This may include a predetermined transaction that the customer has requested through a welcome terminal or mobile device as previously described. Alternatively, the customer may be presented with transaction options through indicia that are output through the display surface. The customer may provide inputs corresponding to data or transaction selections which are operative to indicate the type, characteristics or properties of the transaction which the user wishes to conduct. The inputs from the user are received through the display surface and used through operation of the surface computer or other connected computers to carry out the customer's requested transactions.

For example, if the customer has requested to receive cash, the device located adjacent to the display surface of the surface computer in the area where the customer is standing may operate to cause the cash to be dispensed from the opening. The display surface may operate to indicate to the customer that the cash should be retrieved from the opening below the display surface. This can be done through text outputs, arrows, graphics, or other outputs presented through the display surface. Likewise if the customer is providing a deposit transaction, the customer may be prompted through graphics or other outputs on the display surface to input bills, checks or other accepted items into the opening below the display surface. The items may be received through the opening and processed through operation of the device in a manner like that discussed in the incorporated disclosures.

In exemplary embodiments the customer may also receive other prompts or outputs through the display surface. For example, the surface computer may output a query to the customer as to whether the customer wishes to receive a receipt. In response to an input to the display surface indicating that a receipt is requested, the device positioned in the area where the customer is located may operate to deliver a receipt through the opening. Of course as can be appreciated, other items can be exchanged with the customer and other transactions conducted.

As can be appreciated, in exemplary embodiments the display surface of the surface computer may comprise a relatively large surface with multiple spaced locations at which transaction sessions for multiple transactions by different users can be concurrently conducted. Customers may be selectively directed to such locations in the ways previously discussed, so as to facilitate the carrying out of transactions. Further, transactions that do not require the exchange of tangible materials may be conducted in areas intermediate of the locations and openings in which transaction function devices are located. Further it should be understood that various types of transaction function devices may be located below, above, beside, or even within display surfaces. This may include transactions that are carried out by transporting items to and from the user through use of a VAT carrier. This provides the capability for having numerous different configurations and transaction types. Of course these approaches are exemplary, and in other embodiments other approaches may be used.

In some exemplary embodiments it may be desirable to enhance security within a banking facility by tailoring the security to the locations of banking employees and customers within the banking facility. In some exemplary embodiments one or more detection devices operative to detect a person entering the banking facility may be used to identify individuals entering or within a banking facility. The person may be detected and/or identified by any previously discussed detection method. In some exemplary embodiments the banking customer or employee may be automatically identified or may be identified when the person presents a banking card to a card reading device. Alternatively a user may be identified by a token, mobile device, fob, passbook or other article that can be read through operation of a reading device or that emits signals that can be used to identify the particular device and/or customer associated therewith. A security level may be assigned to the banking customer or employee detected entering the bank, through operation of the banking computer system. It should be understood that for purposes of this disclosure a security level corresponds to authorization and ability to access or operate selected data, functions, devices, areas or other things in accordance with rules or limits that are stored or resolved by one or more computers associated with the facility.

In an exemplary embodiment a banking customer or employee may only have access to the resources that correspond to the security level assigned to them. A banking computer system may be operative to activate different banking resources corresponding to each identified banking customer or employee when the banking customer or employee approaches the resource. Some exemplary banking resources that may be activated according to the assigned security level of the banking customer or employee are computer terminals, computer databases, self service terminal, safety deposit boxes, access control devices, drawers, office space, storage areas, meeting rooms, automatic banking machines, teller areas, safety deposit box areas, and vault areas. In some exemplary embodiments one or more computers operate so that only banking resources adjacent to the determined current location of the person or within a small immediately adjacent zone around the person are activated if authorized according to the security level of the person.

The security level may correspond for example, to whether the person is a high value customer, standard customer, new customer, management banking employee, supervisory bank employee, teller, other bank employee, or in another group of people. The level of security of high value customers may provide access to more resources, areas or data than the security level for regular customers; the security level for regular customers may provide greater access than the security level for new customers; the security level for managers may provide greater access than the security level for supervisory bank employees; the security level for supervisory bank employees may provide greater access than the security level for tellers; and the level of security for tellers may provide greater access than the security level for other bank employees. It should be understood that the category of a particular individual based on the individual's identity as resolved by one or more computers in connection with the system, may provide such individuals with different types of access to resources, devices, areas, data, or other capabilities of the system. It should be understood that for different categories, the nature of the types of activities that can be performed, as well as the extent of authorization to utilize particular aspects of the available capabilities, may be different. Further for purposes of this disclosure, greater access may not necessarily require quantitatively greater capabilities, but only access to different capabilities of the facility, system or data.

In some exemplary embodiments a banking facility may be segmented into a plurality of security zones. Zones may correspond to different areas within the banking facility or to different banking resources. The security zones may include office spaces, teller areas, storage areas, safety deposit box areas, vault areas and public areas. Banking resources that may correspond with a zone include computer terminals, computer databases, account information, safety deposit boxes, drawers and automatic banking machines or other items. Each computer database may include a plurality of sub-databases each with its own security level.

In some exemplary embodiments a bank employee with a higher security level may override a lower security setting on a banking resource that the bank employee needs to access if a person with a lower corresponding security level is in the same security zone.

Figure 8:
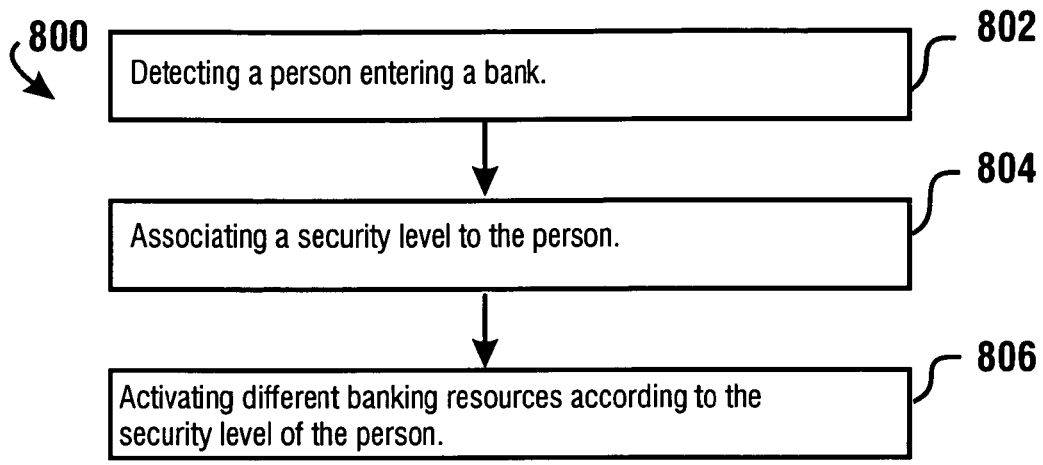
FIG. 8 is a schematic diagram of a method associated with improved banking security using security levels.

FIG. 8 schematically represents an exemplary method of improving banking security using security levels associated with a person 800. The method begins at step 802 by detecting a person entering a bank. When a person is detected, that person may also be identified through operation of one or more computers. At step 804 a security level is assigned to the person detected through operation of such computers. Different banking resources corresponding to the level of security assigned to the person detected are activated in step 806. The banking resources activated responsive to such computers may be only the resources right in front of the person, adjacent to the person or within a limited range of the person to which the person's security level authorizes the person to have access. Of course these approaches are exemplary.

Figure 9:
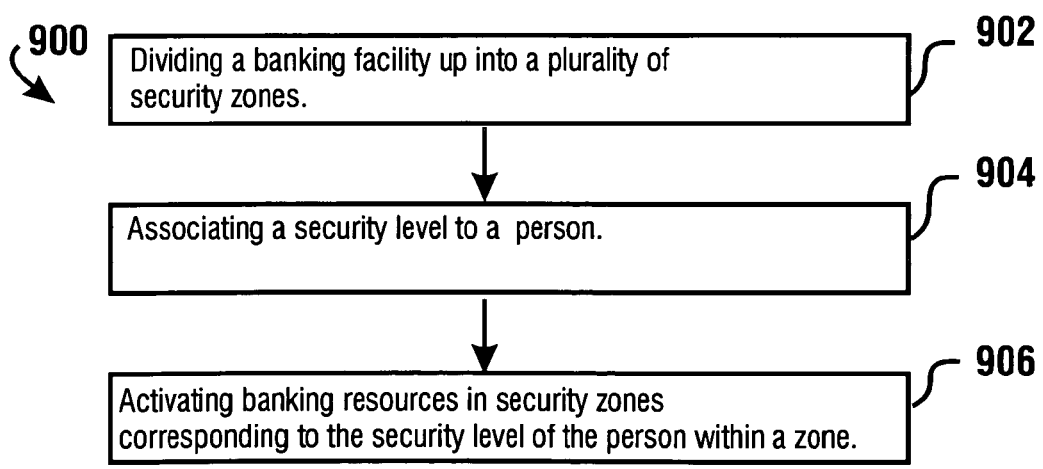
FIG. 9 is a schematic diagram of a method associated with improved banking security using security zones.
Figure 10:
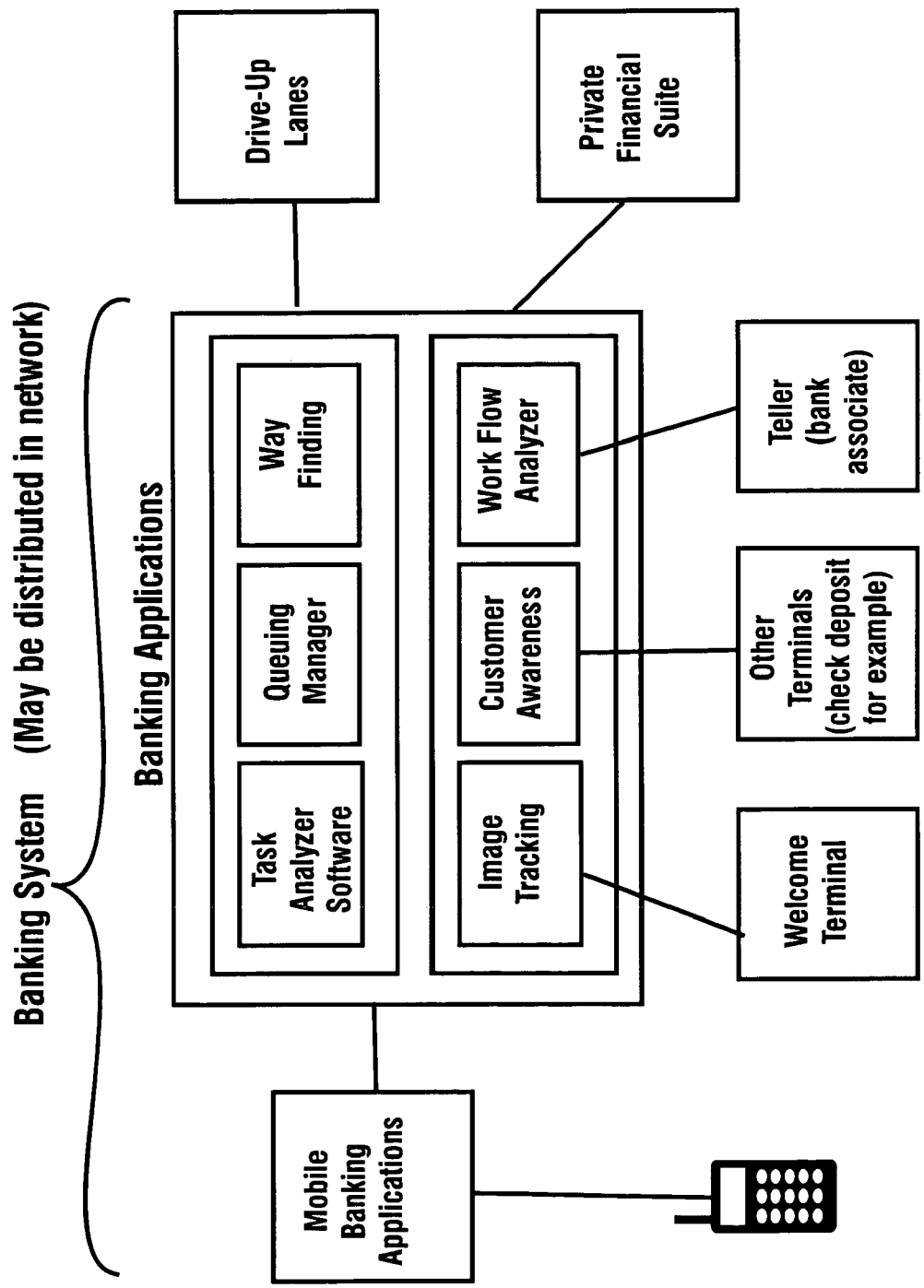
FIG. 10 is a schematic diagram of exemplary software used to improve banking customer transactions.
Figure 11:
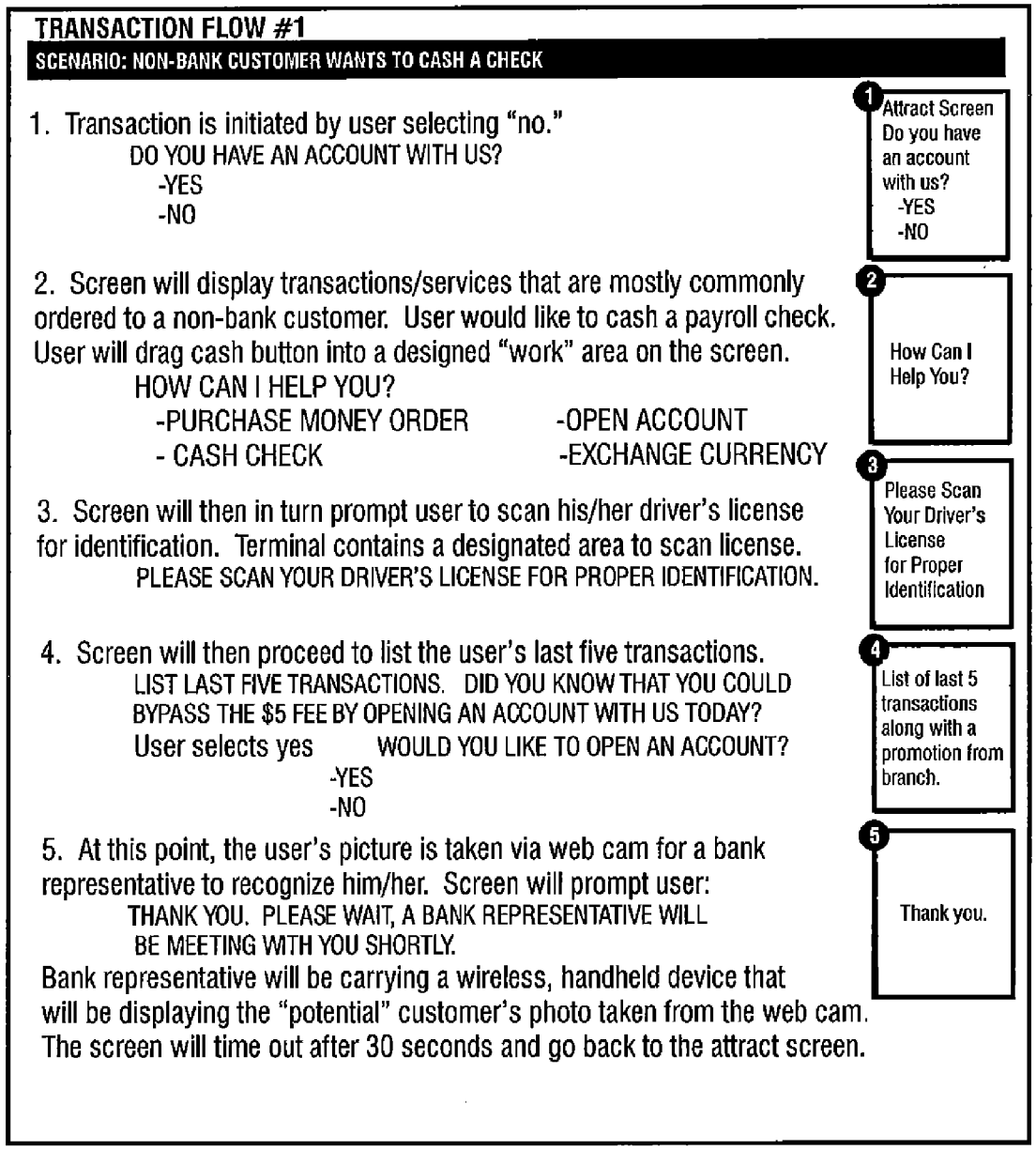
FIG. 11 is a schematic logic flow diagram of an exemplary user interface sequence for a request by a non-banking customer to cash a check.
Figure 13:
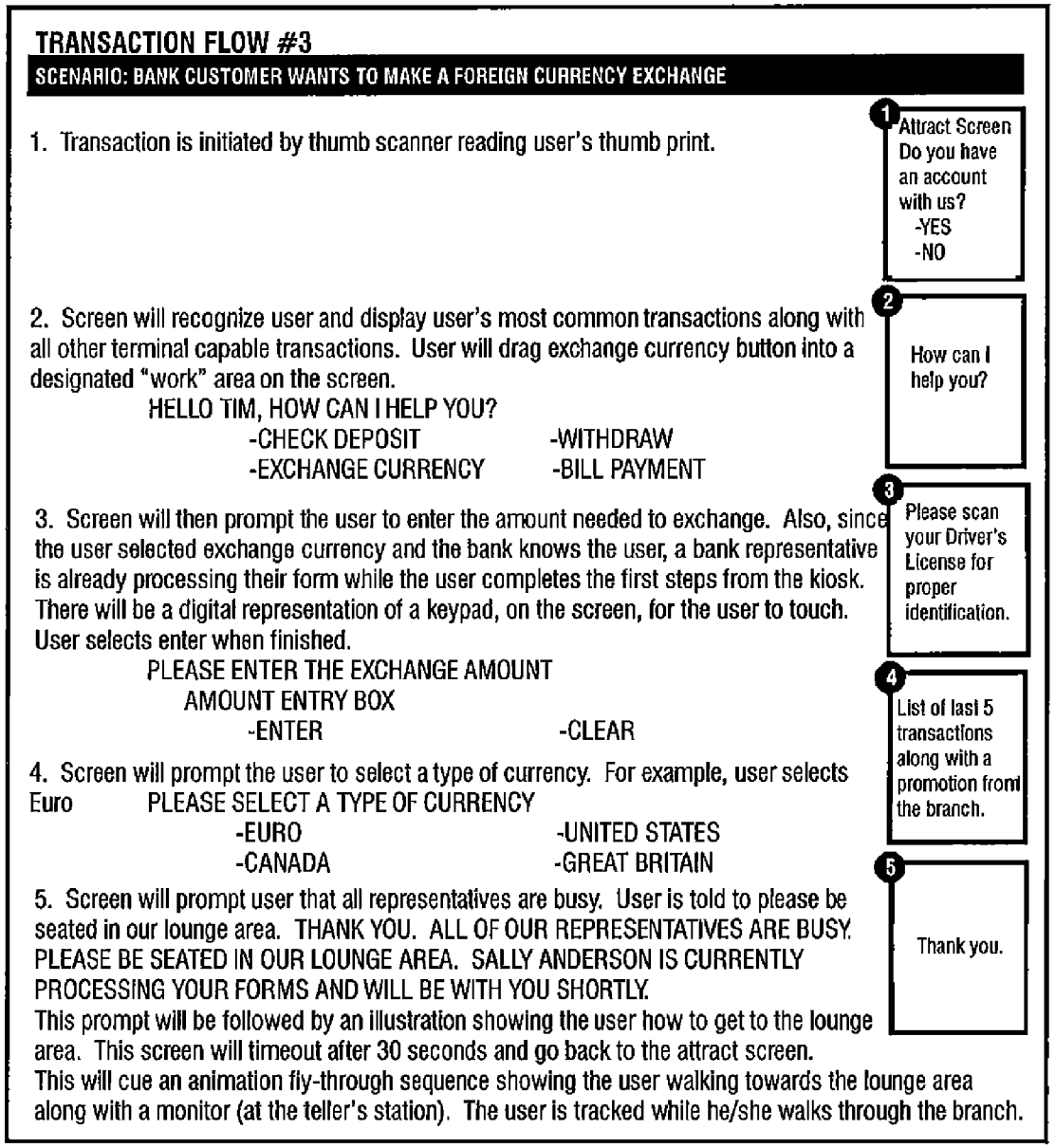
FIG. 13 is a schematic logic flow diagram of an exemplary interface sequence for a request by a banking customer for foreign currency exchange.
Figure 14:
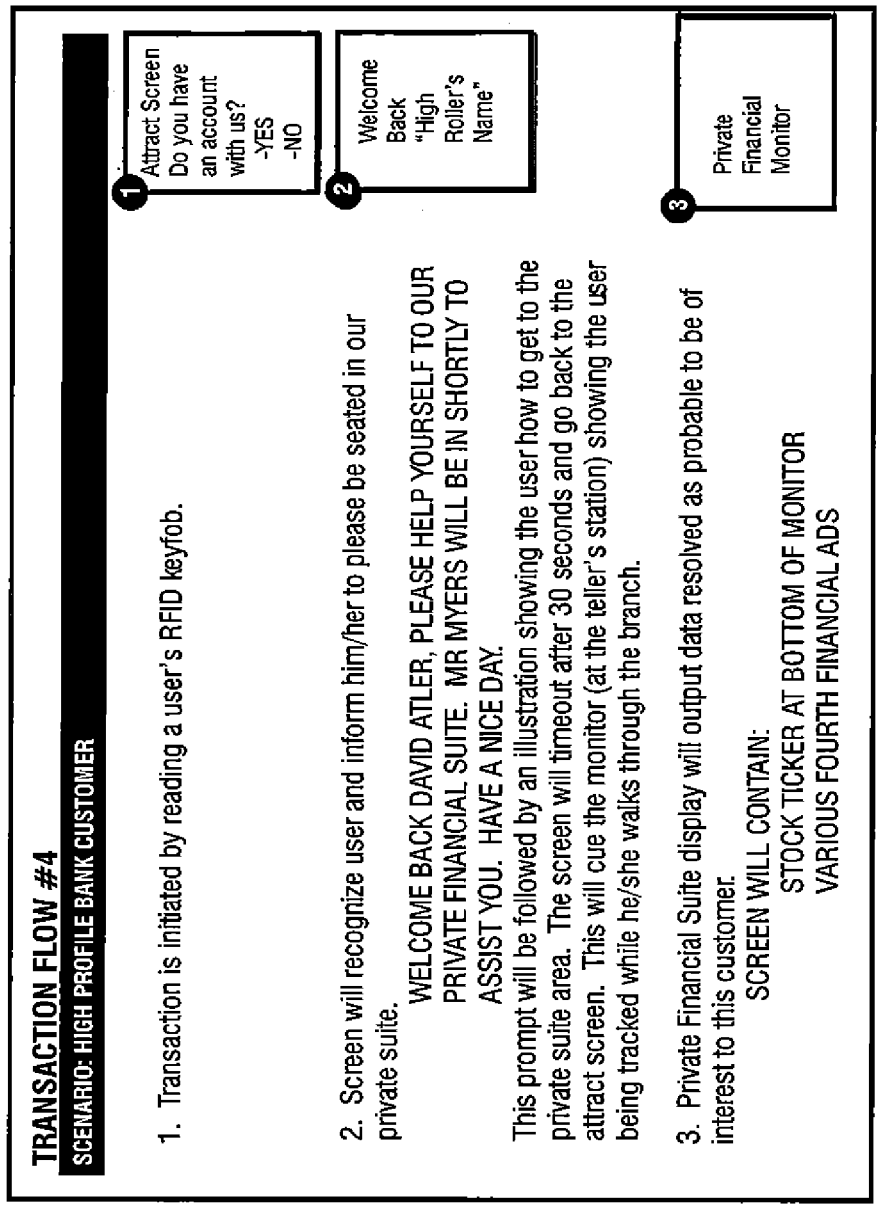
FIG. 14 is a schematic logic flow diagram of an exemplary interface sequence for a request by a high profile banking customer for access to a banking resource.

FIG. 9 schematically represents an exemplary method of improving banking security using security zones 900. The method begins at step 902 by dividing the banking facility through operation of a computer into a plurality of security zones. Zones may correspond to different areas within the banking facility or to different banking resources. In step 904 a security level is assigned to an identified person. In step 906 banking resources within a security zone are activated corresponding to the level of security of a person within that zone. Through operation of one or more computers, the identified individual may operate to receive access to one or more resources, areas, capabilities, data, functions, or other aspects that may be accessed within the banking facility. Computers may operate to minimize the risk of unauthorized activities through the categorization and security levels that are applied to particular individuals. As can be appreciated, in the exemplary embodiments the capabilities of identifying individuals and of granting them different privileges and access to various resources and capabilities enables the more secure conduct of transactions, as well as the preservation of a more secure environment within the banking facility. Of course it should be understood that these approaches are exemplary, and in other embodiments other approaches may be used.

Thus the new apparatus, systems and methods of the exemplary embodiments described may achieve one or more of the above stated objectives, eliminate difficulties encountered in the use of prior devices and systems, solve problems and attain desirable results as described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations given herein are by way of examples and the invention is not limited to the details shown and described.

In the following claims any feature described as a means for performing a function shall be construed as encompassing any means known to those skilled in the art as being capable of performing the recited function, and shall not be limited to the features shown in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. Apparatus comprising:

an automated banking machine including:

a card reader, wherein the card reader is operative to read data from user cards, wherein the card data corresponds to financial accounts;

at least one transaction function device, wherein the at least one transaction function device is operative to at least one of dispense bills, receive checks, and receive bills;

at least one surface computer, wherein the at least one surface computer is in operative connection with the card reader and the at least one transaction function device, wherein the at least one surface computer is operative to cause financial transactions to be carried out, wherein the financial transactions include at least one of transfers of funds to and from financial accounts corresponding to read card data;

wherein the at least one surface computer includes:

a touch screen interface including one planar interface surface, wherein the one planar interface surface includes at least two disposed user locations, wherein each user location is configured to concurrently provide visual outputs through the interface surface and receive user inputs through user contact with the interface surface at each respective user location from at least two respective users.

2. The apparatus according to claim 1 wherein the at least one transaction function device includes an opening, wherein the opening is configured to have at least one of bills and checks move through the opening during transactions, and wherein the opening is positioned vertically below the interface surface.

3. The apparatus according to claim 2 wherein the card reader extends behind the interface surface.

4. The apparatus according to claim 3 wherein the card reader includes a slot, and wherein the slot extends through the interface surface.

5. The apparatus according to claim 3, wherein the card reader comprises a contactless card reader.

6. The apparatus according to claim 3 wherein the at least one surface computer is operative to communicate with a mobile device, and wherein the at least one surface computer is operative to cause the mobile device to communicate with the at least one surface computer responsive to the mobile device being positioned in contact with the interface surface.

7. The apparatus according to claim 6 wherein the at least one surface computer is operative to communicate with the mobile device responsive to user contact with the interface surface adjacent to the mobile device.

8. The apparatus according to claim 7 wherein the at least one surface computer is operative to communicate with the mobile device responsive to a user circling the mobile device with a finger in contact with the interface surface.

9. The apparatus according to claim 6 wherein the at least one surface computer is operative to carry out concurrent transaction sessions including separate financial transactions responsive to inputs through user contacts with the interface surface at each user location.

10. The apparatus according to claim 9 and further comprising at least one eye sensing apparatus, wherein the at least one eye sensing apparatus is in operative connection with the at least one surface computer, wherein the at least one surface computer is operative to position at least a portion of a user location on the interface surface responsive to the eye sensing apparatus.

11. The apparatus according to claim 10 wherein the at least one surface computer is operative to cause bills to be dispensed through the opening of the transaction function device responsive to inputs received at a first user location of the user locations.

12. The apparatus according to claim 11 wherein the at least one surface computer is operative to cause at least one output through the interface surface at the first user location, wherein the at least one output includes a pointer toward the transaction function device opening.

13. The apparatus according to claim 12 and further comprising a biometric reading device, wherein the biometric reading device is in operative connection with the at least one surface computer, wherein the at least one biometric reading device is operative to read at least one user biometric feature through the interface surface.

14. The apparatus according to claim 13 wherein the at least one biometric reading device comprises a fingerprint scanner.

15. The apparatus according to claim 13 wherein the at least one biometric reading device comprises a hand scanner.

16. The apparatus according to claim 13 wherein the at least one surface computer is operative to provide at least one user identifying output through the interface surface at the first user location prior to user arrival at the first user location.

17. The apparatus according to claim 16 wherein the at least one user identifying output includes a user's name.

18. The apparatus according to claim 17 wherein the at least one surface computer is operative to communicate with a user's mobile device, wherein the at least one user identifying output is provided responsive to communication between the at least one surface computer and the user's mobile device.

19. The apparatus according to claim 17 and further comprising a facility and a greeting terminal, wherein the greeting terminal and the at least one surface computer are located in the facility, and wherein the at least one surface computer is operative to communicate with the greeting terminal located in the facility, wherein the facility includes the at least one surface computer, and wherein the at least one user identifying output is provided responsive to communication between the at least one surface computer and the greeting terminal.

20. The apparatus according to claim 1 and further comprising at least one eye sensing apparatus, wherein the at least one eye sensing apparatus is operative to sense where a user's eyes are directed, and wherein the at least one eye sensing apparatus is in operative connection with the at least one surface computer, wherein the at least one surface computer is operative to provide at least one output to the eye sensing apparatus.

21. The apparatus according to claim 1, wherein the at least one surface computer is operative to communicate with a mobile device, and wherein the at least one surface computer is operative to communicate with the mobile device responsive to the mobile device being positioned adjacent to the interface surface.

22. The apparatus relating to claim 1 wherein the at least one surface computer is operative to carry out concurrent financial transactions for different users responsive to inputs through user contacts with the interface surface at each user location.

* * * * *